United States Patent
Porat et al.

(10) Patent No.: US 9,184,969 B2
(45) Date of Patent: Nov. 10, 2015

(54) PREAMBLE FOR USE WITHIN SINGLE USER, MULTIPLE USER, MULTIPLE ACCESS, AND/OR MIMO WIRELESS COMMUNICATIONS

(75) Inventors: Ron Porat, San Diego, CA (US); Vinko Erceg, Cardiff by the Sea, CA (US); Jun Zheng, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 223 days.

(21) Appl. No.: 13/453,703

(22) Filed: Apr. 23, 2012

(65) Prior Publication Data

US 2012/0269123 A1 Oct. 25, 2012

Related U.S. Application Data

(60) Provisional application No. 61/478,537, filed on Apr. 24, 2011, provisional application No. 61/493,577, (Continued)

(51) Int. Cl.
*H04L 27/26* (2006.01)
*H04L 1/00* (2006.01)
(Continued)

(52) U.S. Cl.
CPC ............ *H04L 27/2613* (2013.01); *H04L 1/007* (2013.01); *H04L 1/0041* (2013.01);
(Continued)

(58) Field of Classification Search
CPC ...... H04B 1/38; H04B 7/0639; H04B 7/0452; H04B 7/024; H04B 7/0456; H04B 7/0417; H04B 7/0632; H04B 7/0469; H04B 7/0617; H04B 7/0413; H04B 7/2656; H04B 7/0634; H04B 7/0684; H04B 7/0689; H04B 7/0842; H04L 1/0003; H04L 1/0025; H04L 1/0028; H04L 5/0023; H04L 5/0048; H04L 5/0053; H04L 5/0007; H04L 5/0035; H04L 5/0051; H04L 27/2613; H04L 29/06163; H04L 69/18; H04L 2001/0093; H04L 2025/03426; H04L 25/0224; H04L 25/00; H04W 74/006

USPC ......... 375/260, 267, 295, 342, 347, 362, 364; 370/328, 334, 474, 312, 345, 465, 473, 370/208, 336, 503, 498, 499, 500, 343, 344
See application file for complete search history.

(56) References Cited

U.S. PATENT DOCUMENTS 7,856,068 B1    12/2010  Tung et al.
8,437,440 B1 *   5/2013  Zhang et al. ................. 375/366
(Continued)

FOREIGN PATENT DOCUMENTS

EP     2395678 A1    12/2011
WO  2011/019968 A1   2/2011

OTHER PUBLICATIONS

Li et al., Advancement of MIMO technology in WiMAX: from IEEE 802.16d/e/j to 802.16m; Jun. 2009; IEEE Communications Society, Communications Magazine, vol. 47, Issue 6, pp. 100-107.*

(Continued)

*Primary Examiner* — Benjamin H Elliott, IV
*Assistant Examiner* — Eric Nowlin
(74) *Attorney, Agent, or Firm* — Garlick & Markison; Shayne X. Short

(57) ABSTRACT

Preamble for use within single user, multiple user, multiple access, and/or MIMO wireless communications. A selected preamble type is employed for use in generating a signal to be transmitted from one communication device to at least one other communication device. Depending upon a desired operational mode, as few as one preamble type, or two or more preamble types may be associated with a given operational mode. When operating in accordance with a given operational mode, a preamble type is selected from available preamble types of an operational mode. A preferred implementation may include two respective preamble types such that one preamble type is used for single user (SU) operation with transmit beamforming weights applied at the beginning of the packet or for open loop SU transmissions only, while the other preamble type, having an multiple user (MU) characteristic, is used for both SU beamforming and MU operations.

20 Claims, 22 Drawing Sheets

Related U.S. Application Data filed on Jun. 6, 2011, provisional application No. 61/496,153, filed on Jun. 13, 2011, provisional application No. 61/501,239, filed on Jun. 26, 2011, provisional application No. 61/507,955, filed on Jul. 14, 2011, provisional application No. 61/512,363, filed on Jul. 27, 2011, provisional application No. 61/522,608, filed on Aug. 11, 2011, provisional application No. 61/542,602, filed on Oct. 3, 2011, provisional application No. 61/561,722, filed on Nov. 18, 2011, provisional application No. 61/577,597, filed on Dec. 19, 2011, provisional application No. 61/584,142, filed on Jan. 6, 2012, provisional application No. 61/592,514, filed on Jan. 30, 2012, provisional application No. 61/595,616, filed on Feb. 6, 2012, provisional application No. 61/598,293, filed on Feb. 13, 2012, provisional application No. 61/602,504, filed on Feb. 23, 2012.

(51) Int. Cl.
*H04L 5/00* (2006.01)
*H04L 1/06* (2006.01)
*H04B 7/04* (2006.01)
*H04B 7/06* (2006.01)

(52) U.S. Cl.
CPC ............ *H04L1/0075* (2013.01); *H04L 1/0625* (2013.01); *H04B 7/0452* (2013.01); *H04B 7/0669* (2013.01); *H04B 7/0697* (2013.01); *H04L 1/0017* (2013.01); *H04L 1/0025* (2013.01); *H04L 5/0092* (2013.01); *H04L 27/2626* (2013.01); *H04L 27/2647* (2013.01); *H04L 2001/0098* (2013.01)

(56) References Cited

U.S. PATENT DOCUMENTS

| | | |
|---|---|---|
| 2005/0181728 A1 | 8/2005 | Hansen et al. |
| 2007/0097946 A1 | 5/2007 | Mujtaba |
| 2010/0040158 A1* | 2/2010 | Aggarwal et al. ............. 375/260 |
| 2010/0290449 A1* | 11/2010 | van Nee et al. ................ 370/338 |
| 2011/0051705 A1* | 3/2011 | Jones et al. ................... 370/338 |
| 2011/0188482 A1* | 8/2011 | Vermani et al. ............... 370/338 |

OTHER PUBLICATIONS

Chen et al., Proposed TGac Draft Amendment, Jan. 2011, IEEE, doc.: IEEE 802.11-10/1361r3, Jan. 2011, pp. 1-154.*

Zhang, et al.; 11ah Preamble for 2MHz and Beyond; IEEE-SA Mentor: IEEE P802.11—Task Group AH—Meeting Update; Nov. 7, 2011; pp. 1-17; vol. 802.11ah.

Aust, et al.; IEEE 802.11ah: Advantages in standards and further challenges for sub 1 GHz Wi-Fi; 2012 IEEE International Conference on Communications (ICC); Jun. 10, 2012; pp. 6885-6889; sections IV.B-IV.E; figures 4-11.

European Search Report; European Patent Office; EP Application No. 12002882.4; Apr. 23, 2013; 4 pgs.

* cited by examiner

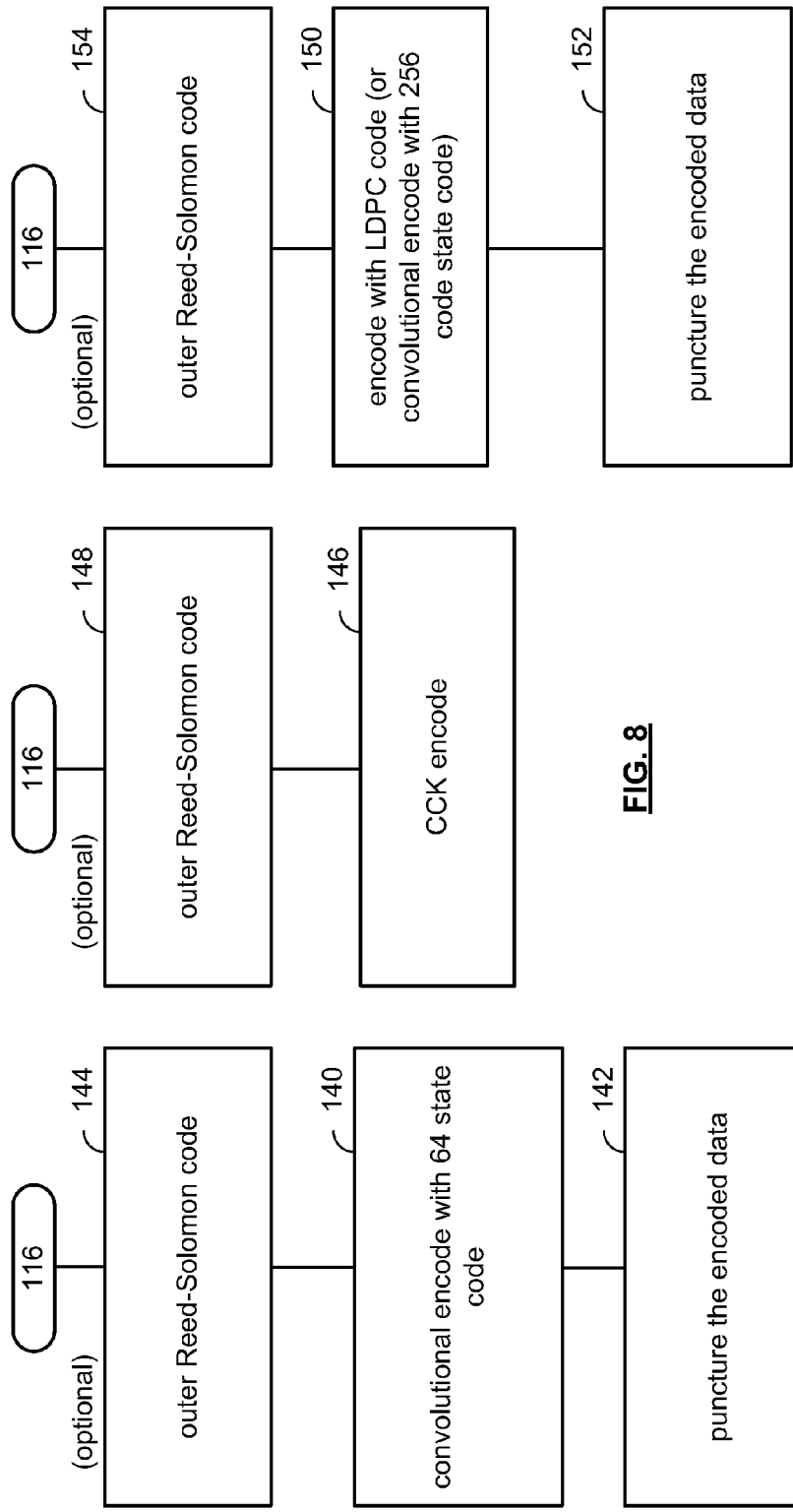

1800

| TX Type | Preamble format options (e.g., one column selected) | | | | |
|---|---|---|---|---|---|
| SU-OP | OP1 | OP2 | OP1 | OP1 | MU |
| SU-CL | OP1 | OP2 | OP2 | OP1 | MU |
| MU | MU | MU | MU | MU | MU |

- option table (subset of most viable among all of possible options)

FIG. 18

PREAMBLE FOR USE WITHIN SINGLE USER, MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Patent Application Ser. No. 61/478,537, entitled "Preamble for use within multiple user, multiple access, and/or MIMO wireless communications," filed Apr. 24, 2011, pending.

2. U.S. Provisional Patent Application Ser. No. 61/493,577, entitled "Preamble for use within multiple user, multiple access, and/or MIMO wireless communications," filed Jun. 6, 2011, pending.

3. U.S. Provisional Patent Application Ser. No. 61/496,153, entitled "Preamble for use within multiple user, multiple access, and/or MIMO wireless communications," filed Jun. 13, 2011, pending.

4. U.S. Provisional Patent Application Ser. No. 61/501,239, entitled "Preamble for use within multiple user, multiple access, and/or MIMO wireless communications," filed Jun. 26, 2011, pending.

5. U.S. Provisional Patent Application Ser. No. 61/507,955, entitled "Preamble for use within multiple user, multiple access, and/or MIMO wireless communications," filed Jul. 14, 2011, pending.

6. U.S. Provisional Patent Application Ser. No. 61/512,363, entitled "Preamble for use within multiple user, multiple access, and/or MIMO wireless communications," filed Jul. 27, 2011, pending.

7. U.S. Provisional Patent Application Ser. No. 61/522,608, entitled "Preamble for use within multiple user, multiple access, and/or MIMO wireless communications," filed Aug. 11, 2011, pending.

8. U.S. Provisional Patent Application Ser. No. 61/542,602, entitled "Preamble for use within single user, multiple user, multiple access, and/or MIMO wireless communications," filed Oct. 3, 2011, pending.

9. U.S. Provisional Patent Application Ser. No. 61/561,722, entitled "Preamble for use within single user, multiple user, multiple access, and/or MIMO wireless communications," filed Nov. 18, 2011, pending.

10. U.S. Provisional Patent Application Ser. No. 61/577,597, entitled "Preamble for use within single user, multiple user, multiple access, and/or MIMO wireless communications," filed Dec. 19, 2011, pending.

11. U.S. Provisional Patent Application Ser. No. 61/584,142, entitled "Preamble for use within single user, multiple user, multiple access, and/or MIMO wireless communications," filed Jan. 6, 2012, pending.

12. U.S. Provisional Patent Application Ser. No. 61/592,514, entitled "Preamble for use within single user, multiple user, multiple access, and/or MIMO wireless communications," filed Jan. 30, 2012, pending.

13. U.S. Provisional Patent Application Ser. No. 61/595,616, entitled "Preamble for use within single user, multiple user, multiple access, and/or MIMO wireless communications," filed Feb. 6, 2012, pending.

14. U.S. Provisional Patent Application Ser. No. 61/598,293, entitled "Preamble for use within single user, multiple user, multiple access, and/or MIMO wireless communications," filed Feb. 13, 2012, pending.

15. U.S. Provisional Patent Application Ser. No. 61/602,504, entitled "Preamble for use within single user, multiple user, multiple access, and/or MIMO wireless communications," filed Feb. 23, 2012, pending.

INCORPORATION BY REFERENCE

The following U.S. Utility Patent Applications are hereby incorporated herein by reference in their entirety and made part of the present U.S. Utility Patent Application for all purposes:

1. U.S. Utility patent application Ser. No. 13/453,998, entitled "Doppler adaptation using pilot patterns within single user, multiple user, multiple access, and/or MIMO wireless communications," filed concurrently on Apr. 23, 2012, pending.

2. U.S. Utility patent application Ser. No. 13/454,010, entitled "Long training field (LTF) for use within single user, multiple user, multiple access, and/or MIMO wireless communications," filed concurrently on Apr. 23, 2012, pending.

3. U.S. Utility patent application Ser. No. 13/454,021, entitled "Short training field (STF) for use within single user, multiple user, multiple access, and/or MIMO wireless communications," filed concurrently on Apr. 23, 2012, pending.

4. U.S. Utility patent application Ser. No. 13/454,033, entitled "Device coexistence within single user, multiple user, multiple access, and/or MIMO wireless communications," filed concurrently on Apr. 23, 2012, pending

INCORPORATION BY REFERENCE

The following IEEE standards/draft IEEE standards are hereby incorporated herein by reference in their entirety and are made part of the present U.S. Utility Patent Application for all purposes:

1. IEEE Std 802.11™—2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, Sponsored by the LAN/MAN Standards Committee, IEEE Std 802.11™—2012, (Revision of IEEE Std 802.11—2007), 2793 total pages (incl. pp. i-xcvi, 1-2695).

2. IEEE Std 802.11n™—2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™—2009, (Amendment to IEEE Std 802.11™—2007 as amended by IEEE Std 802.11k™—2008, IEEE Std 802.11r™—2008, IEEE Std 802.11y™—2008, and IEEE Std 802.11r™—2009), 536 total pages (incl. pp. i-xxxii, 1-502).

3. IEEE Draft P802.11-REVmb™/D12, November 2011 (Revision of IEEE Std 802.11™—2007 as amended by IEEE Std 802.11k™—2008, IEEE Std 802.11r™—2008, IEEE Std 802.11y™—2008, IEEE Std 802.11w™—2009, IEEE Std 802.11n™—2009, IEEE Std 802.11p™—2010, IEEE Std 802.11z™—2010, IEEE Std 802.11v™—2011, IEEE Std 802.11u™—2011, and IEEE Std 802.11s™—2011), "IEEE Standard for Information technology—Telecommunications and information exchange between systems—Local and metropolitan area networks—Specific requirements; Part 11: Wireless LAN Medium Access Control (MAC) and Physical Layer (PHY) Specifications," Prepared by the 802.11 Working Group of the LAN/MAN Standards Committee of the IEEE Computer Society, 2910 total pages (incl. pp. i-cxxviii, 1-2782).

4. IEEE P802.11ac™/D2.1, March 2012, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz," Prepared by the 802.11 Working Group of the 802 Committee, 363 total pages (incl. pp. i-xxv, 1-338).

5. IEEE P802.11ad™/D6.0, March 2012, (Draft Amendment based on IEEE P802.11REVmb D12.0), (Amendment to IEEE P802.11REVmb D12.0 as amended by IEEE 802.11ae D8.0 and IEEE 802.11aa D9.0), "IEEE P802.11ad™/D6.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band," Sponsor: IEEE 802.11 Committee of the IEEE Computer Society, IEEE-SA Standards Board, 664 total pages.

6. IEEE Std 802.11ae™—2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," "Amendment 1: Prioritization of Management Frames," IEEE Computer Society, Sponsored by the LAN/MAN Standards Committee, IEEE Std 802.11ae™—2012, (Amendment to IEEE Std 802.11™—2012), 52 total pages (incl. pp. i-xii, 1-38).

7. IEEE P802.11af™/D1.06, March 2012, (Amendment to IEEE Std 802.11REVmb™/D12.0 as amended by IEEE Std 802.11ae™/D8.0, IEEE Std 802.11aa™/D9.0, IEEE Std 802.11ad™/D5.0, and IEEE Std 802.11ac™/D2.0), "Draft Standard for Information Technology—Telecommunications and information exchange between systems—Local and metropolitan area networks—Specific requirements—Part 11: Wireless LAN Medium Access Control (MAC) and Physical Layer (PHY) Specifications—Amendment 5: TV White Spaces Operation," Prepared by the 802.11 Working Group of the IEEE 802 Committee, 140 total pages (incl. pp. i-xxii, 1-118).

BACKGROUND OF THE INVENTION

1. Technical Field of the Invention

The invention relates generally to communication systems; and, more particularly, it relates to effectuating long range and low rate wireless communications within such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802, 11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF DESCRIPTION OF THE SEVERAL VIEWS OF THE DRAWINGS

FIGS. 7-9 are diagrams illustrating various embodiments for encoding the scrambled data.

FIG. 18 illustrates an embodiment of an option table for preamble format options for different transmission types.

DETAILED DESCRIPTION OF THE INVENTION

Figure 1:
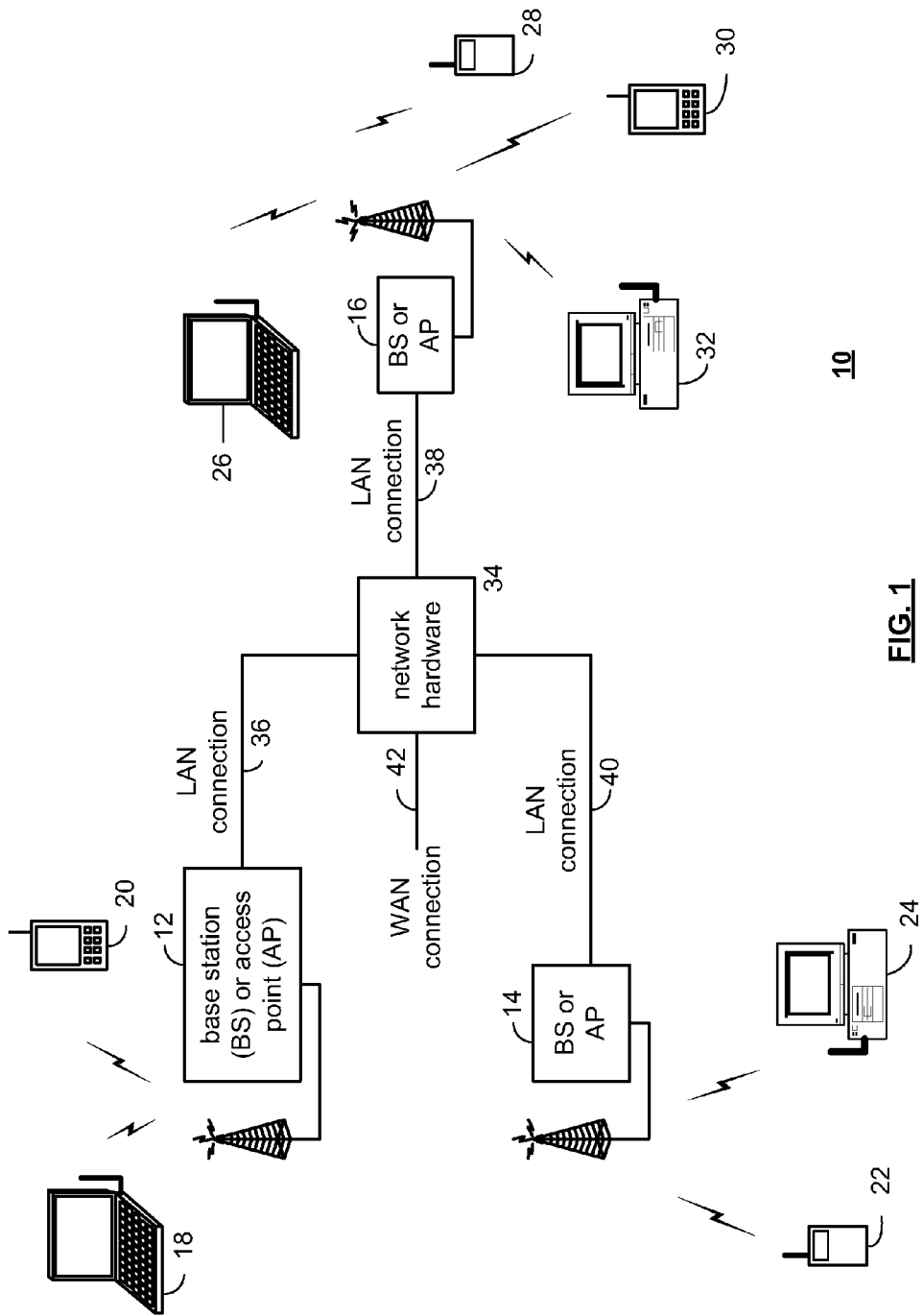
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices are described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various aspects of the invention as presented herein to enhance performance, reduce costs, reduce size, and/or enhance broadband applications.

Figure 2:
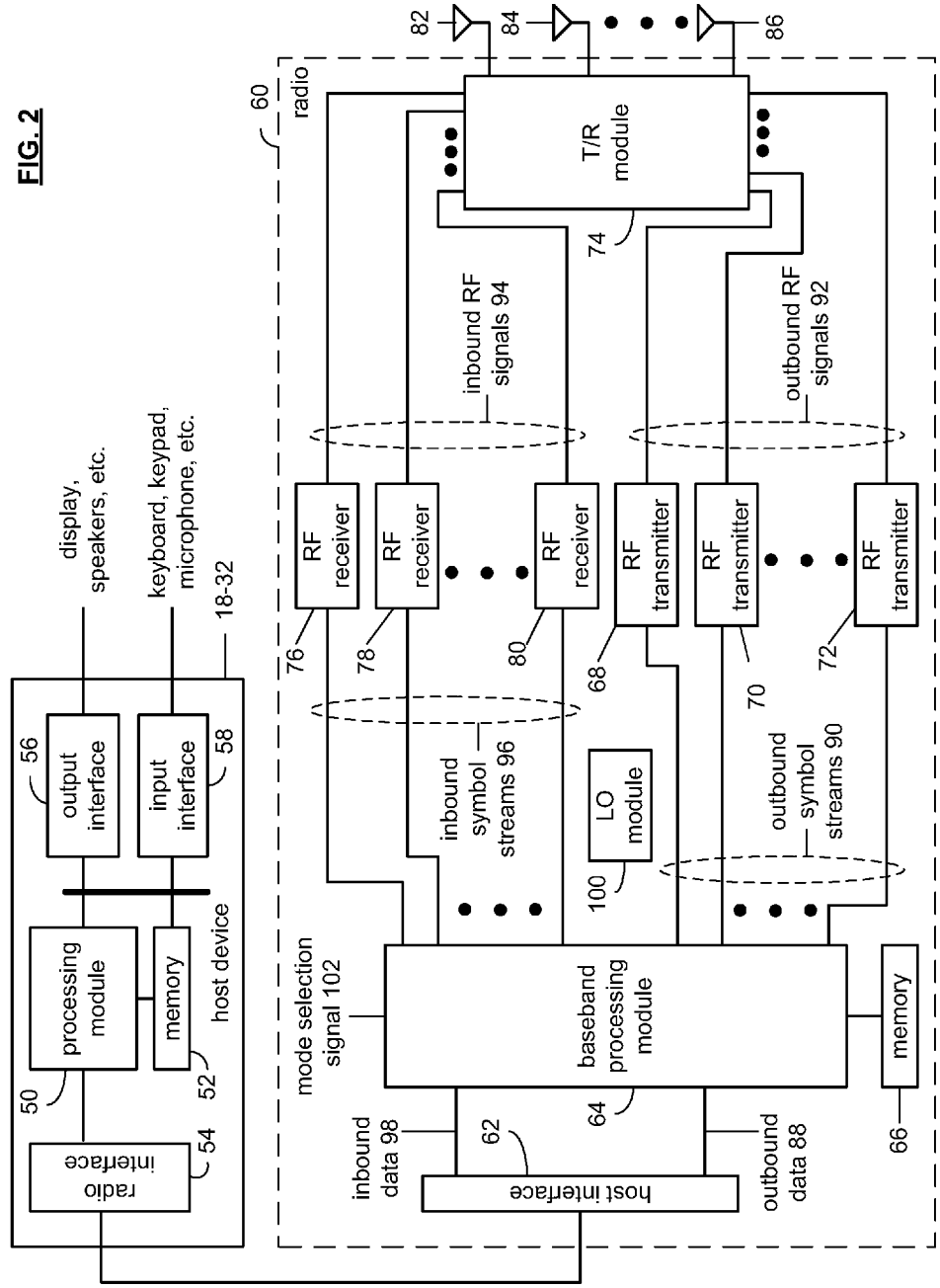
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per sub-carrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 64 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
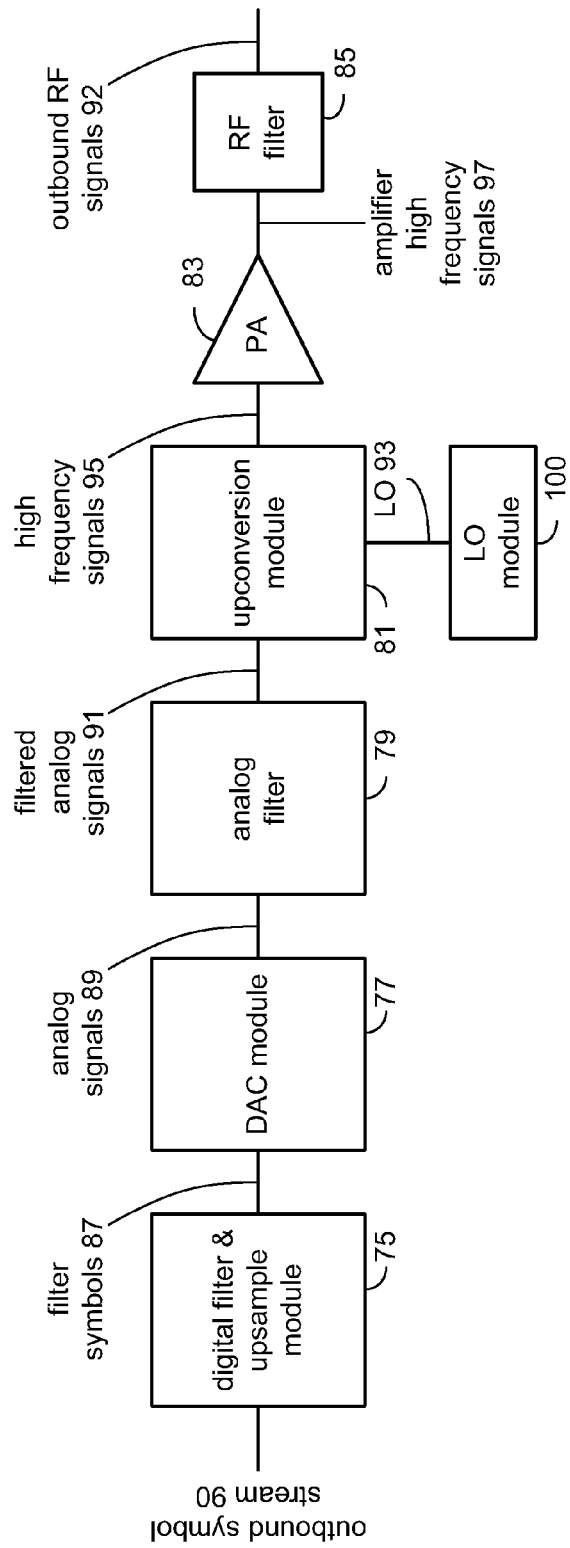
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the outbound RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
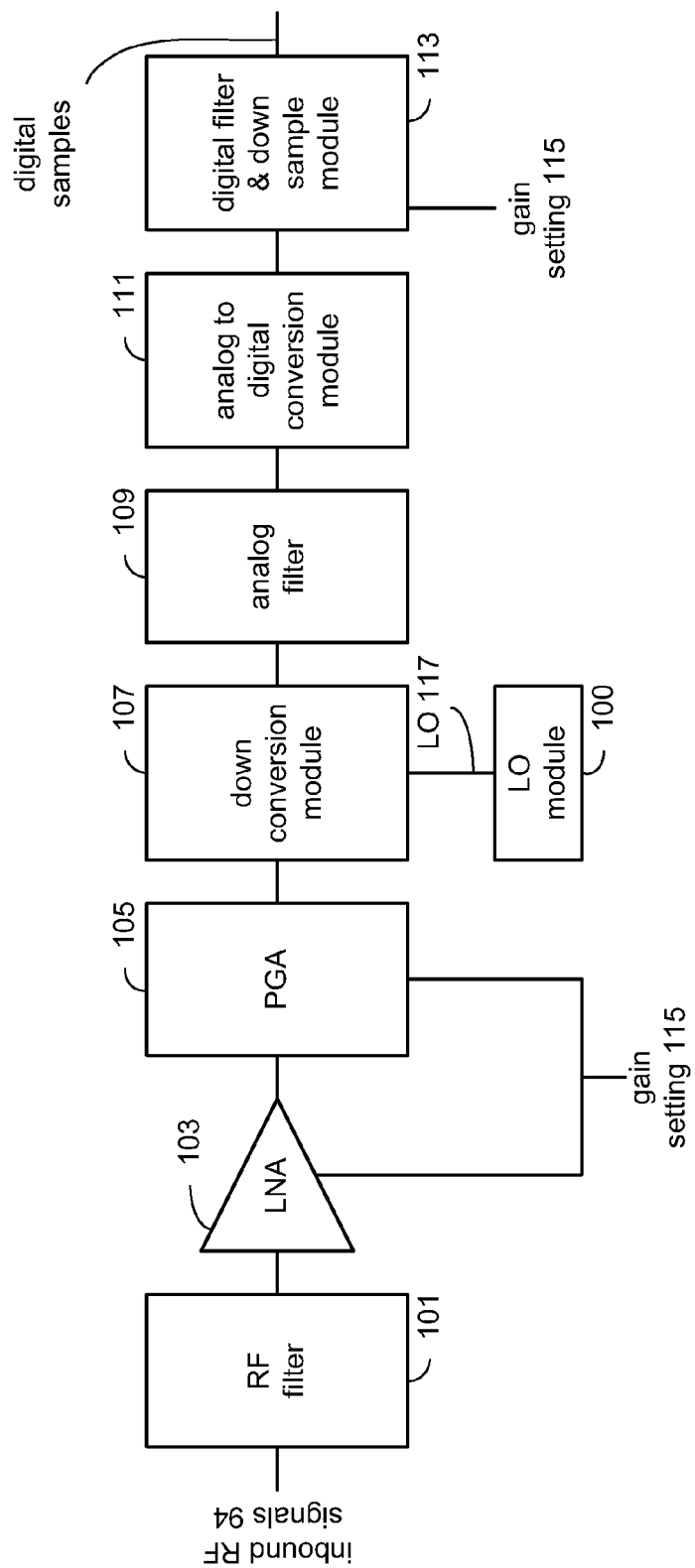
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency bandpass filter, receives the inbound RF signals 94 and filters them to produce filtered inbound RF signals. The low noise amplifier 103 amplifies the filtered inbound RF signals 94 based on a gain setting 115 and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) signal 117 that is provided by the local oscillation (LO) module 100 to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
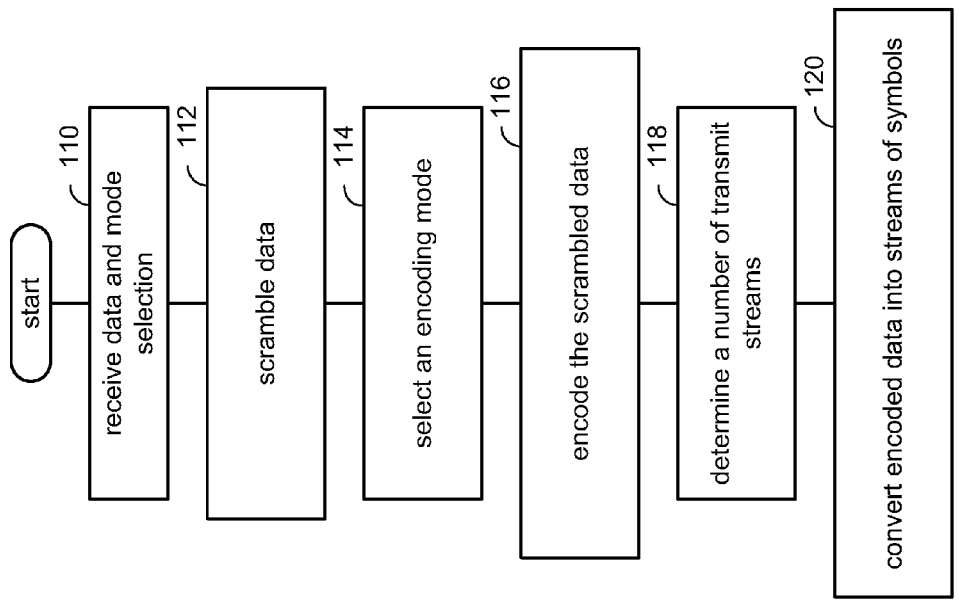
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
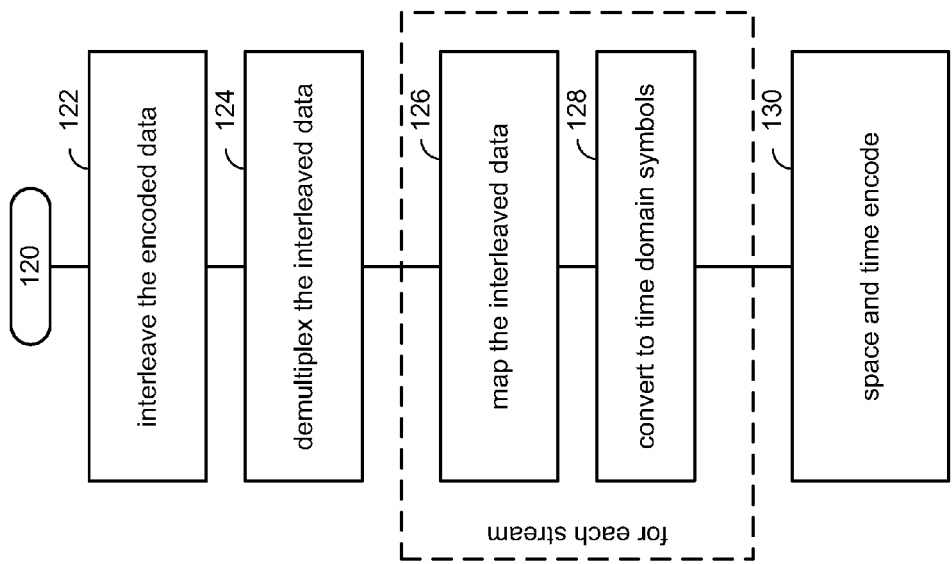
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and sub-carriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M In one embodiment the encoding matrix may comprise a form of:

$$\begin{bmatrix} C_1 & C_2 & C_3 & C_4 & \dots & C_{2M-1} & C_{2M} \\ -C_2^* & C_1^* & -C_4^* & C_3^* & \dots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include ½, ⅔ and/or ¾, or any rate as specified in tables 1-12. Note that, for a particular mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
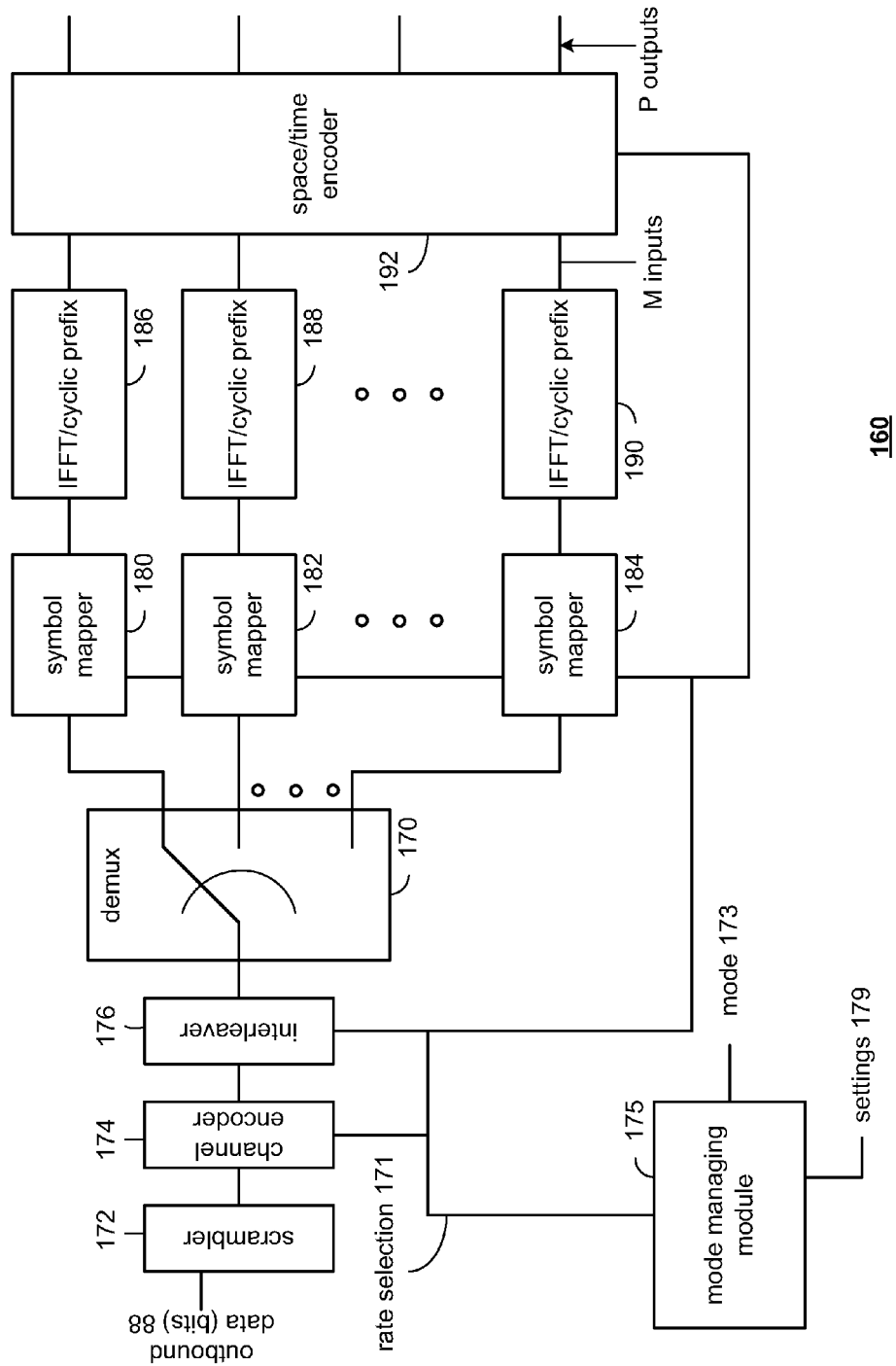
FIGS. 10A and 10B are diagrams illustrating embodiments of a radio transmitter.
Figure 10B:
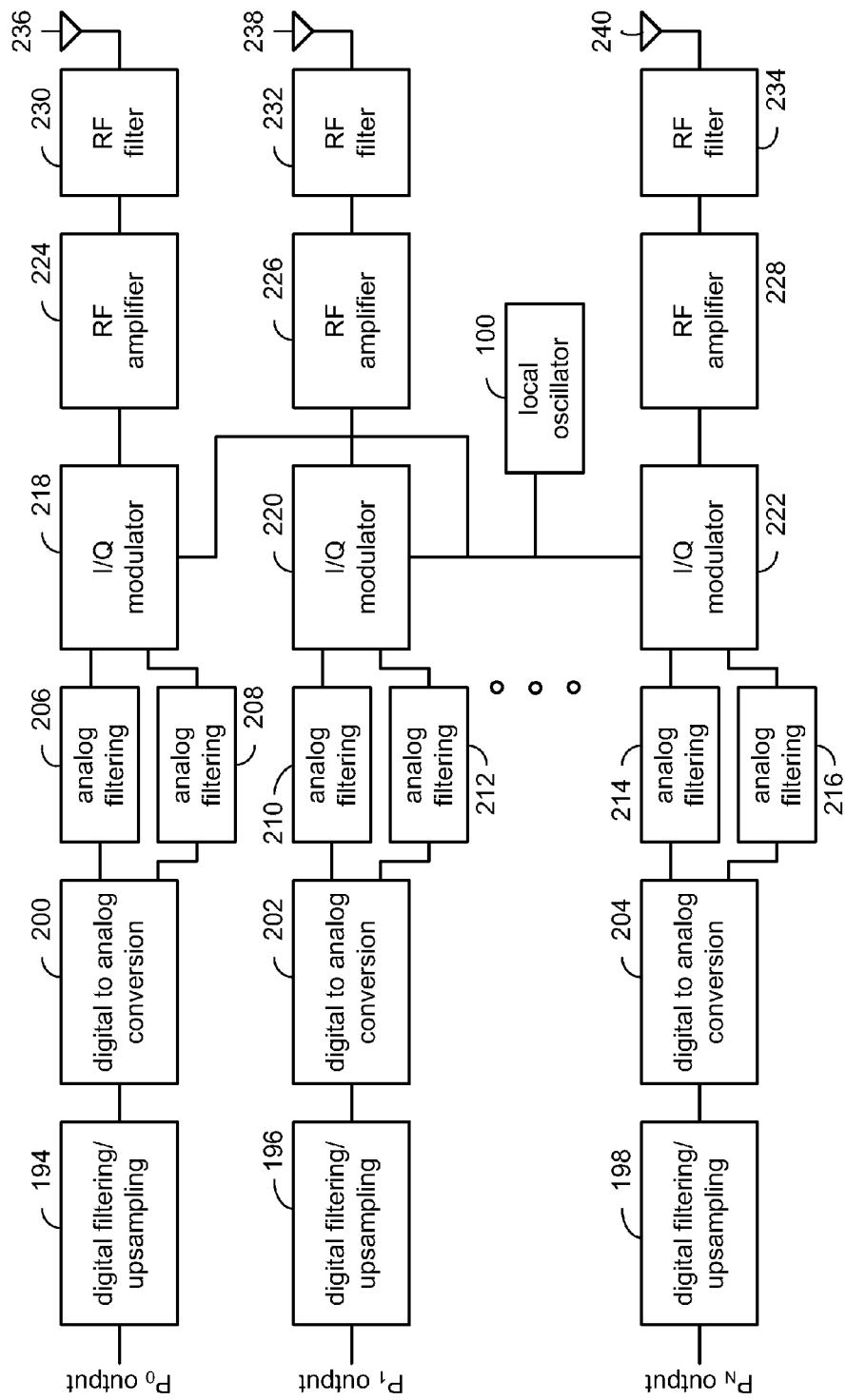

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 170, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleaver 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔, and ¾ according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 170 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, etc.) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} C_1 & C_2 & C_3 & C_4 & \ldots & C_{2M-1} & C_{2M} \\ -C_2^* & C_1^* & -C_4^* & C_3^* & \ldots & -C_{2M}^* & C_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 206-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
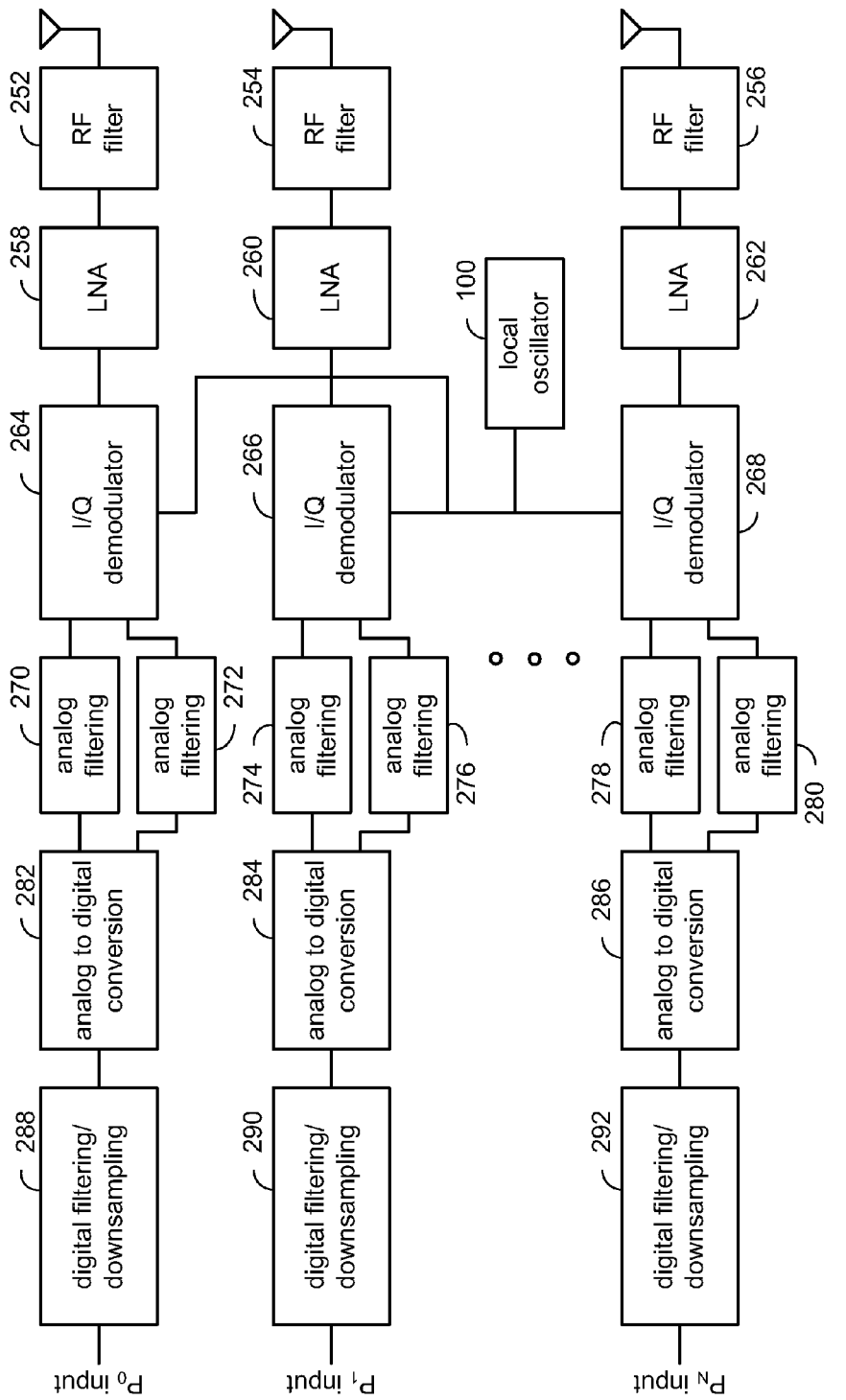
FIGS. 11A and 11B are diagrams illustrating embodiments of a radio receiver.
Figure 11B:
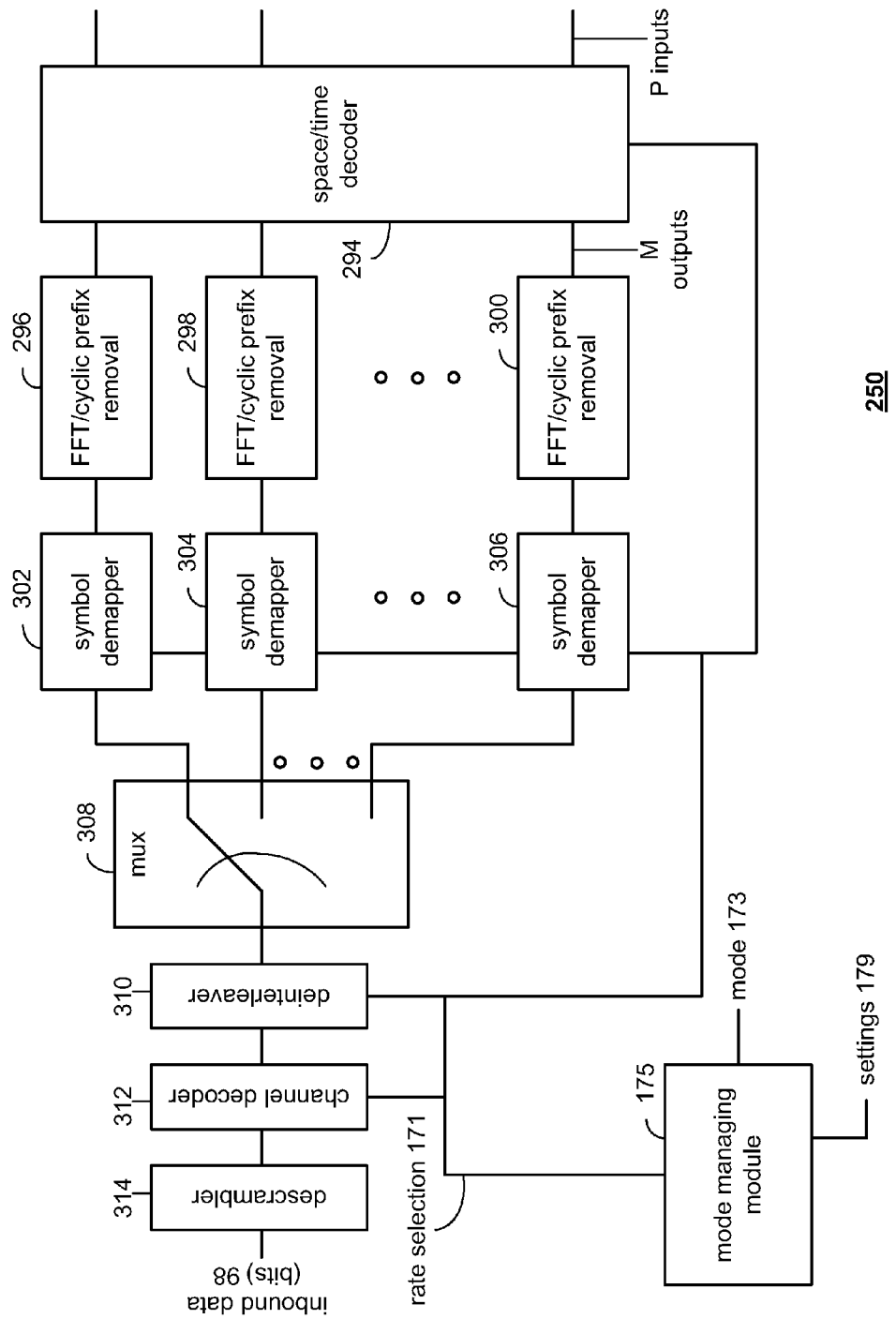

FIGS. 11A and 11B are diagrams illustrating embodiments of a radio receiver (as shown by reference numeral 250). These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-262, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-262 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
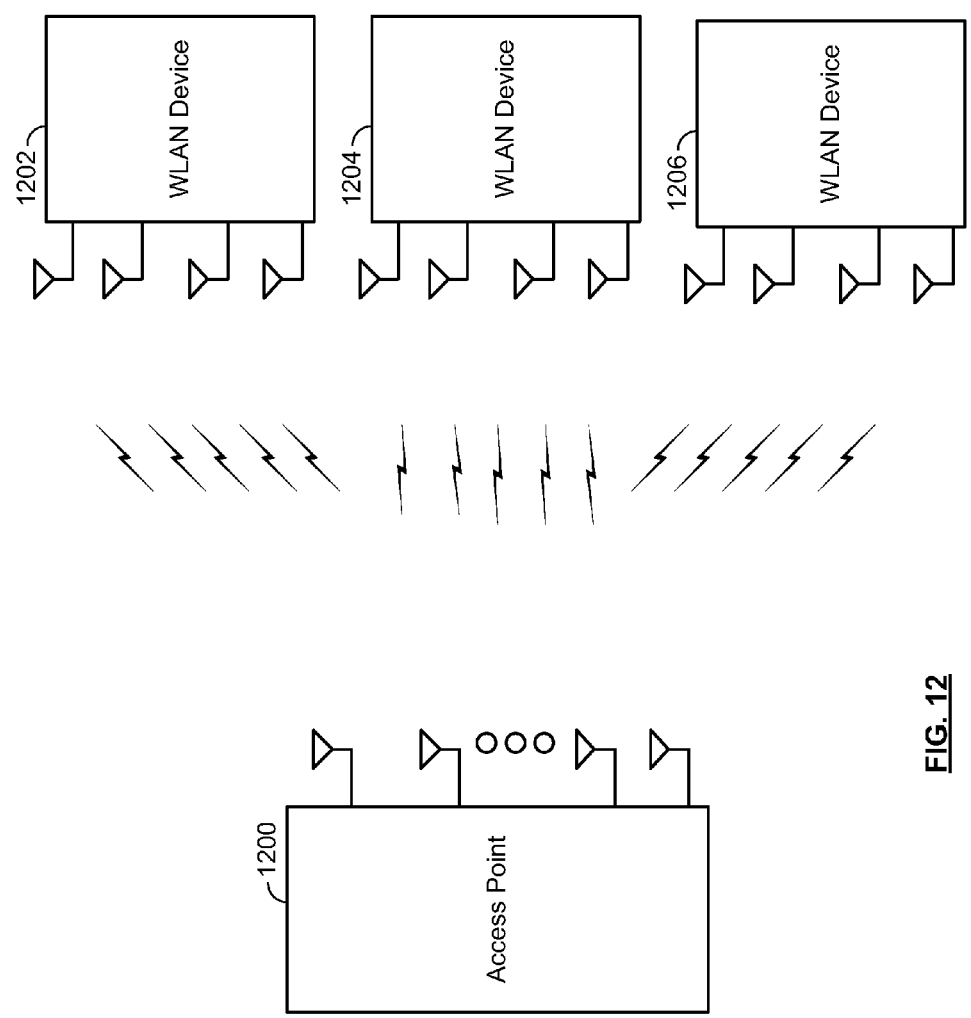
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11 (a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission (e.g., OFDM may be viewed as being a subset of OFDMA). A single MU-MIMO transmission may include spatially-diverse signals over a common set of tones, each containing distinct information and each transmitted to one or more distinct receivers. Some single transmissions may be a combination of OFDMA and MU-MIMO. Multi-user (MU), as described herein, may be viewed as being multiple users sharing at least one cluster (e.g., at least one channel within at least one band) at a same time.

MIMO transceivers illustrated may include SISO, SIMO, and MISO transceivers. The clusters employed for such communications (e.g., OFDMA communications) may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments. Such a MU-MIMO/OFDMA transmitter (e.g., an AP or a STA) may transmit packets to more than one receiving wireless communication device (e.g., STA) on the same cluster (e.g., at least one channel within at least one band) in a single aggregated packet (such as being time multiplexed). In such an instance, channel training may be required for all communication links to the respective receiving wireless communication devices (e.g., STAs).

Figure 13:
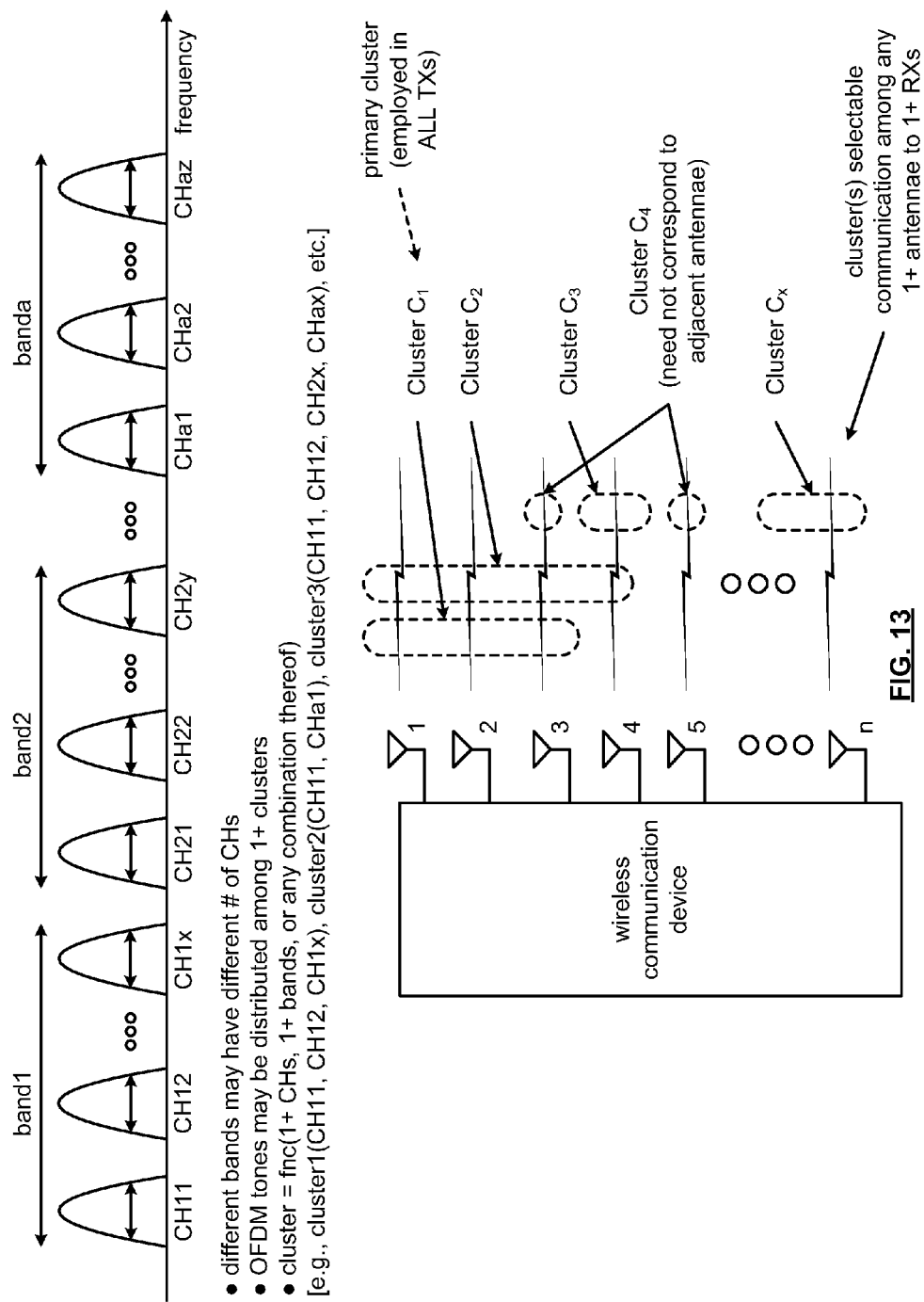
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Also, it is noted that, with respect to certain embodiments, general nomenclature may be employed wherein a transmitting wireless communication device (e.g., such as being an Access point (AP), or a wireless station (STA) operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications. Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system. Generally speaking, such capability, functionality, operations, etc. as described herein may be applied to any wireless communication device.

Various aspects and principles, and their equivalents, of the invention as presented herein may be adapted for use in various standards, protocols, and/or recommended practices (including those currently under development) such as those in accordance with IEEE 802.11x (e.g., where x is a, b, g, n, ac, ad, ae, af, ah, etc.).

For example, the IEEE 802.11ah is a new protocol/standard currently under development and is intended for long range and low rate applications operating in worldwide spectrum below 1 GHz. The available spectrum in each country differs and requires flexible design to accommodate different options. As such, modifications to the IEEE 802.11 standards, protocols, and/or recommended practices may be made to effectuate longer delay spread and lower data rate applications such as may be employed in accordance with the IEEE 802.11 ah developing standard. Herein, from certain perspectives, certain adaptation and/or modification may be made with respect to IEEE 802.11ac standards, protocols, and/or recommended practices to provide efficient support for longer delay spread and lower data rate applications.

Figure 14:
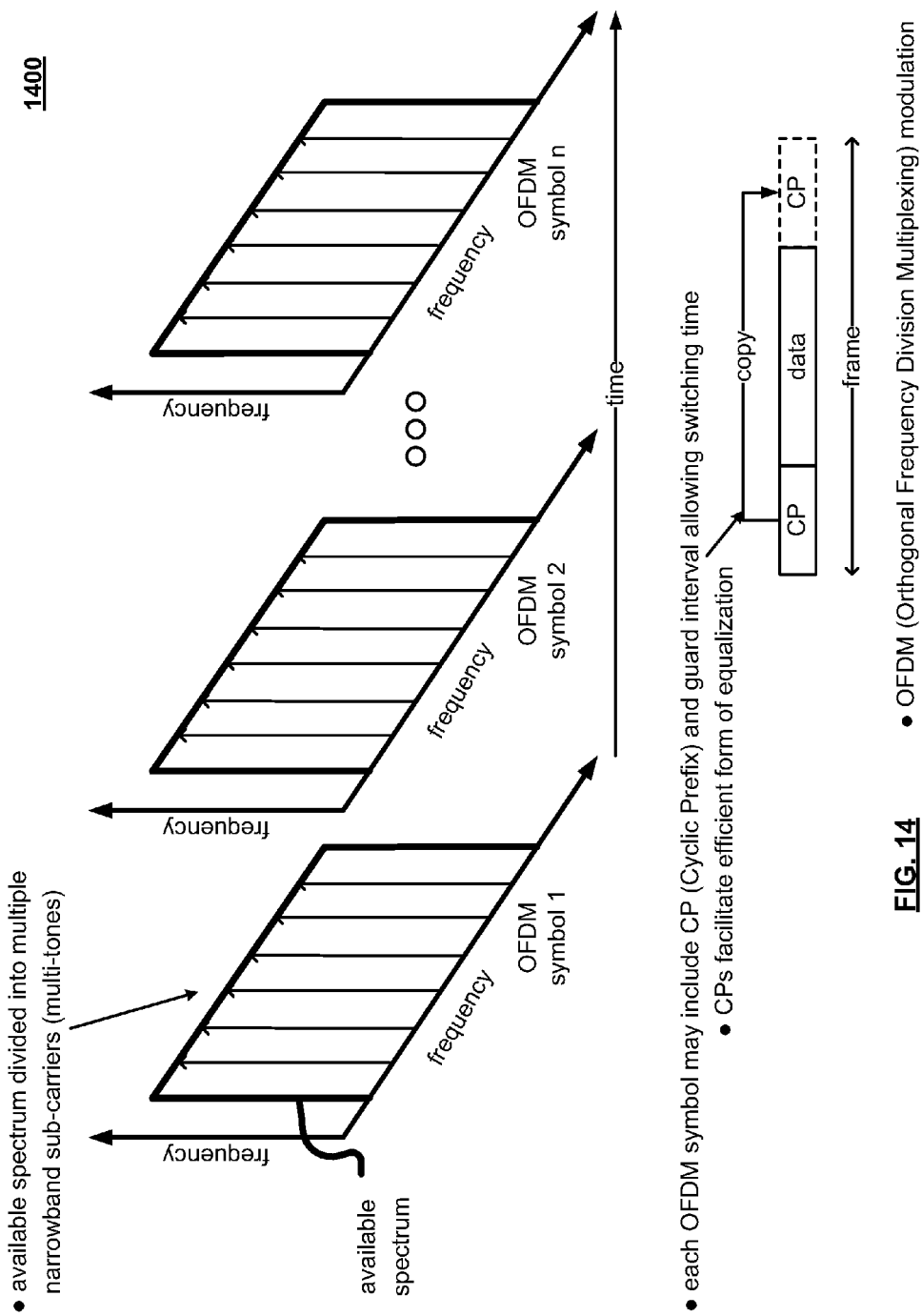
FIG. 14 illustrates an embodiment of OFDM (Orthogonal Frequency Division Multiplexing).

FIG. 14 illustrates an embodiment 1400 of OFDM (Orthogonal Frequency Division Multiplexing). OFDM modulation may be viewed a dividing up an available spectrum into a plurality of (narrowband) tones or sub-carriers (e.g., lower data rate tones or carriers). Typically, the frequency responses of these sub-carriers are overlapping and orthogonal. Each tone or sub-carrier may be modulated using any of a variety of modulation coding techniques.

OFDM modulation operates by performing simultaneous transmission of a larger number of (narrowband) tones or sub-carriers (or multi-tones). Oftentimes a guard interval (GI) or guard space is also employed between the various OFDM symbols to try to minimize the effects of ISI (Inter-Symbol Interference) that may be caused by the effects of multi-path within the communication system (which can be particularly of concern in wireless communication systems). In addition, a CP (Cyclic Prefix) may also be employed within the guard interval to allow switching time (when jumping to a new band) and to help maintain orthogonality of the OFDM symbols. Generally speaking, OFDM system design is based on the expected delay spread within the communication system (e.g., the expected delay spread of the communication channel).

Herein, a novel preamble structure is presented that is suitable for a variety of operational modes including those applicable for single-user (SU) case, multi-user (MU) case, etc. With respect to IEEE 802.11ac, it is noted that only a single preamble is included with respect to the SU case (e.g., the second signal field (SIG-B) is disregarded for the SU case.) With respect to the lower frequency, narrowband channel, and longer range applications associated with the currently developing IEEE 802.11ah standard (e.g., in accordance with the Task Group TGah), a proposal for two different types of preambles is presented herein (e.g., with respect to embodiments for a short preamble structure and a long preamble structure).

The following signaling may be included in the preamble employed for wireless communication.

An indication of the preamble having a format corresponding to either single-user (SU) or multi-user (MU) applications may be provided in the SIG-A field. For example, 1 or 2 bits (or a series or group of bits) may be implemented to provide indication for different preamble types and/or types of transmissions (e.g., MU, SU Open Loop, SU Beamforming).

In addition, there may be some indication before the Signal field (SIG-A) that would indicate one of the two (or more) modulation coding set (MCS) possibilities of SIG-A and/or a second Signal field (SIG-B). This indication may be in the short training field (STF) and/or within the long training field (LTF). The indication may be related to field content, inverted polarity, and/or phase shifts.

With respect to the lower frequency, narrowband channel, and longer range applications associated with the currently developing IEEE 802.11ah standard (e.g., in accordance with the Task Group TGah), it may be desirable to construct relatively shorter preambles (as opposed relatively long fields being employed within the preambles thereof). As such, novel approaches are presented herein by which the preamble may be shortened such as in accordance with the construction of the STF and/or LTF fields therein.

For example, bits start to appear in a packet within the signal field (SIG-A) to indicate information related to the packet. However, herein, additional information may be provided even before those bits related to the signal field (SIG-A) begin to appear (e.g., such as in accordance with what may be viewed as being an encrypted pre-SIG-A field). That is to say, even if the MCS of SIG-A is specified (e.g., usually as being a relatively lowest order so that all wireless communication devices can properly receive, demodulate, decode, etc. at least the SIG-A of the packet), but some means of communicating such information can be provided changing some indication that the signal field (SIG-A) is not of that default MCS (e.g., by effectuating at least one phase shift, and/or at least one polarity shift, etc.) because up to and before the SIG-A field, there are no bits there to indicate such. A change may be effectuated for certain properties of the signal corresponding to these proportions of the signal to indicate what is happening later in the field (e.g., such as in accordance with an encrypted pre-SIG-A field as may be effectuated by these at least one phase shift, and/or at least one polarity shift, etc.).

Figure 15:
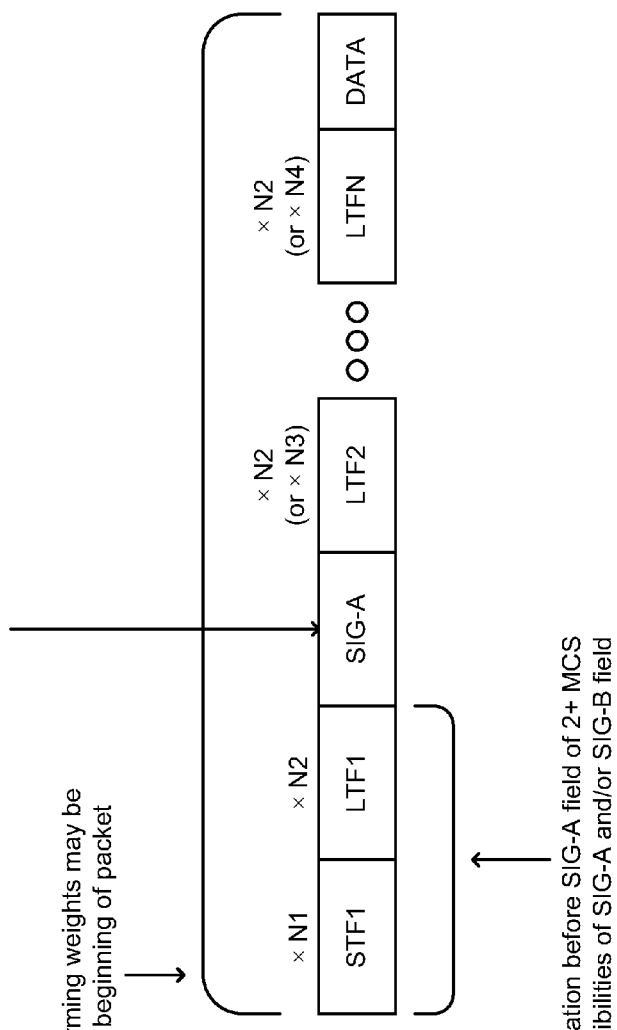
FIG. 15 illustrates an embodiment of a preamble for use in packetized communications for single-user (SU) applications.

FIG. 15 illustrates an embodiment 1500 of a preamble for use in packetized communications for single-user (SU) applications. This embodiment 1500 may be viewed as being a SU Case Option 1. As may be seen, transmit beamforming weights may be applied at the beginning of the packet.

Figure 16:
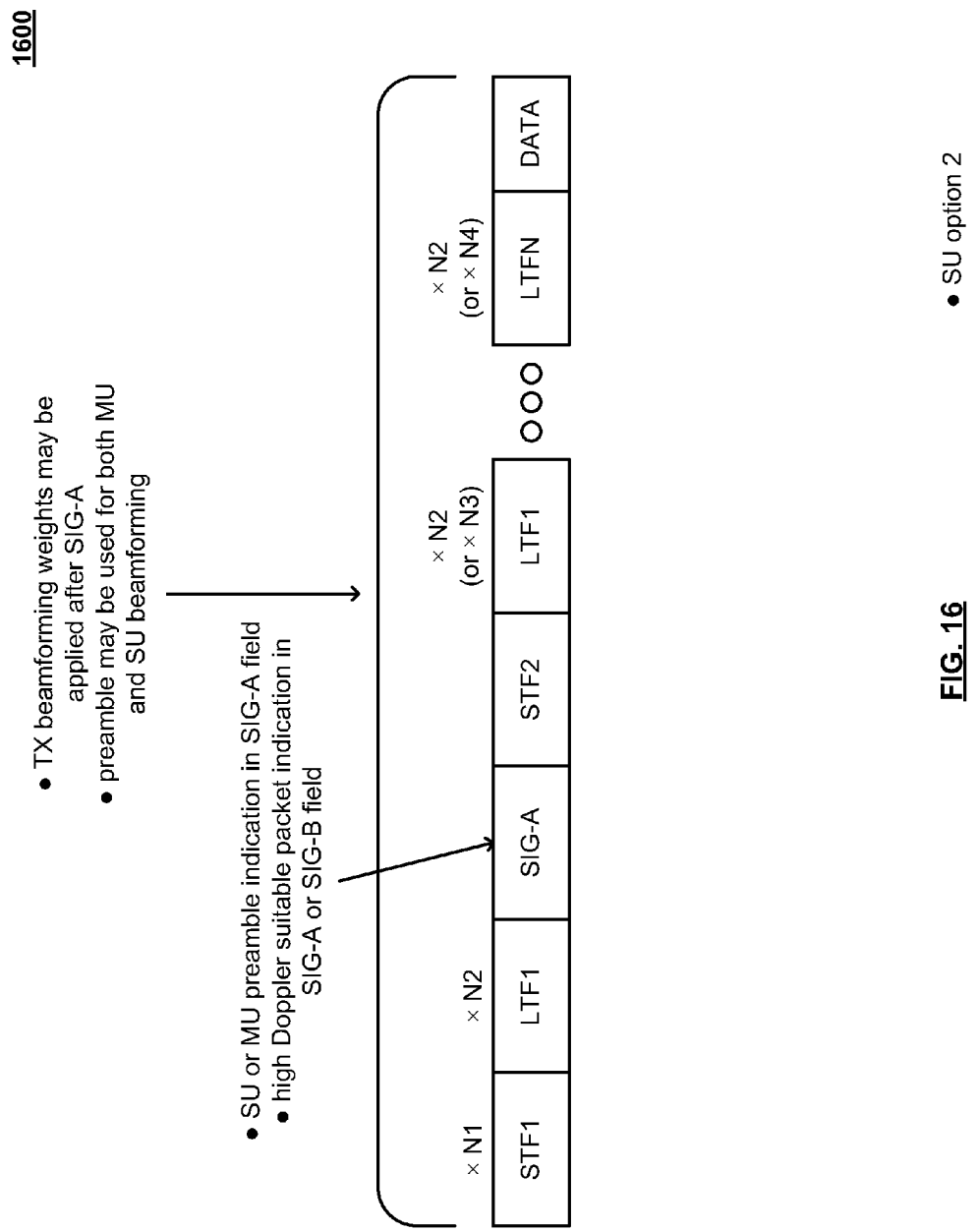
FIG. 16 illustrates an alternative embodiment of a preamble for use in packetized communications for SU applications.

FIG. 16 illustrates an alternative embodiment 1600 of a preamble for use in packetized communications for SU applications. This embodiment 1600 may be viewed as being a SU Case Option 2. As may be seen, transmit beamforming weights may be applied after the signal field (SIG-A).

Figure 17:
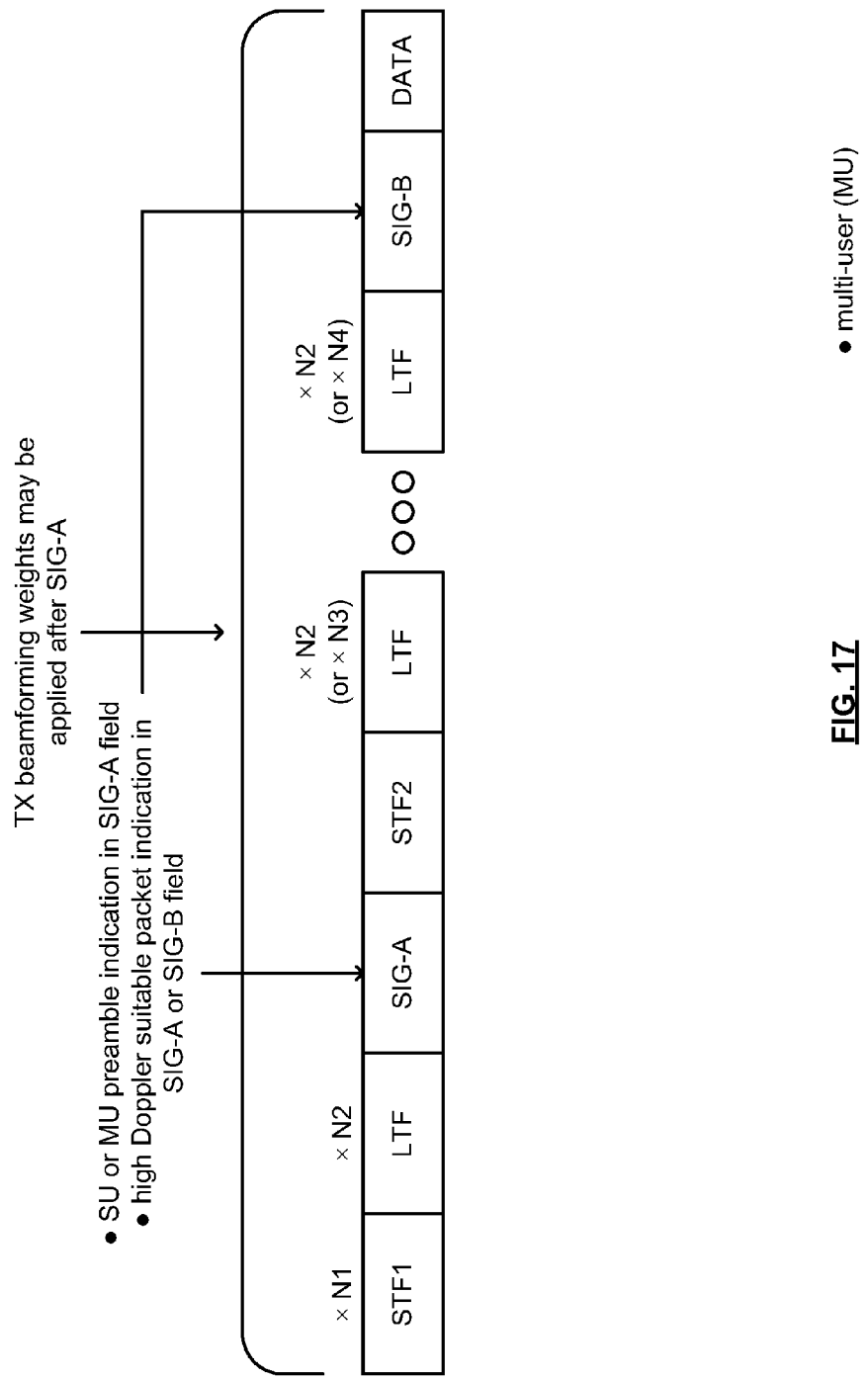
FIG. 17 illustrates an embodiment of a preamble for use in packetized communications for multi-user (MU) applications.

FIG. 17 illustrates an embodiment 1700 of a preamble for use in packetized communications for multi-user (MU) applications. This embodiment 1700 may be viewed as being a MU Preamble Case.

As may be seen, beamforming (precoding) may be applied after the signal field (SIG-A). The preamble structure may be used for both the MU Beamforming and SU Beamforming cases. The indicia of N1, N2 (and/or N3, N4) indicate that symbols may be repeated by a different number of repetitions (e.g., any integer between 1-4 in one embodiment).

A preamble structure such as may be suitable for the currently developing IEEE 802.11ah standard may have some attributes that are analogous to that which is compliant with IEEE 802.11 ac. For example, the signal field (SIG-A) may be implemented to include bits that must be seen by all users and uses the lowest MCS in the system (e.g., lower order modulation, lower code rate, etc.) so that all wireless communication devices can receive, demodulate, decode, etc. at least that portion of the packet. Also, the second signal field (SIG-B) may be implemented to include bits that are user specific.

However, a preamble structure such as may be suitable for the currently developing IEEE 802.11ah standard may have other attributes that are different and particularly suited for such lower frequency, narrowband channel, and longer range applications. For example, the signal field (SIG-A) may be implemented to include bits that may signal the MCS used for Data and the MCS used for the second signal field (SIG-B). In an embodiment in which the Data MCS and SIG-B MCSs are different, a delta (difference, such as Δ) between the two MCSs may be signaled in the signal field (SIG-A). For example, the signal field (SIG-A) may signal the MCS used for the second signal field (SIG-B) and the second signal field (SIG-B) then signals the MCS used for DATA. That is to say, the signal field (SIG-A) may indicate within the MCS for each of the separate and respective different, following fields.

Alternatively, the signal field (SIG-A) may indicate a ΔMCS (e.g., a difference based on at least one additional MCS) such that the ΔMCS is with respect to the MCS of the second signal field (SIG-B) so that the MCS of the second signal field (SIG-B) and the ΔMCS may be used for properly processing the DATA.

A variety of preamble combinations (e.g., from among 5 rep combinations) may be chosen. For example, the signal field (SIG-A) may contain 1 or 2 bits (or a series or group of bits) may be implemented to provide indication for different preamble types and/or types of transmissions (e.g., MU, SU Open Loop, SU Beamforming).

With respect to these various combinations, it is submitted that at least one column (such as with respect to FIG. 18 referenced below) would be selected, and then, based on that selected column, the preamble format will be specified as a function of the type of transmission.

Combination #1:
  SU Option 1 may be used for both SU Beamforming and SU Open loop MU preamble may be used for MU transmissions
Two preamble types
Combination #2:
SU Option 2 may be used for both SU Beamforming and SU Open loop
MU preamble may be used for MU transmissions
Two preamble types
Combination #3:
SU Option 1 may be used for Open Loop SU transmissions only
SU Option 2 in that case may be used for SU Beamforming (Closed Loop) transmissions
MU preamble may be used for MU transmissions
Three preamble types
Combination #4:
SU Option 1 may be used for Open Loop SU transmissions only
MU preamble may be used for both SU Beamforming and MU case
In the SU Beamforming case SIG-B may not be relevant, it may be ignored
Two preamble types
Combination #5:
To reduce the implementation complexity, only MU preamble may be selected for SU (Open Loop and Beamforming) and MU transmissions
Single preamble type
SIG-A indicates SU or MU transmission case With respect to the STF1 field indicated in the beginning of the packet, the STF1 field may be implemented in accordance with power boosting when compared to the other fields of the packet. The increased power may provide for better packet detection, timing and synchronization.

In some embodiments, the STF2 field may be considerably shorter than the STF1 field since it is used for automatic gain control (AGC) and/or AGC estimation, which can be coarse. For example, in accordance with IEEE 802.11a/n/ac, there are 10 short repetitions of 0.8 μs in the STF. In accordance with one embodiment that may be employed within the currently developing IEEE 802.11ah standard, one or two short repetitions may be used only. However, in accordance with the currently developing IEEE 802.11ah standard, each repetition may be longer because of the bandwidth scaling (down-clocking).

It is noted that the STF2 field may not be present in all embodiments. For example, a cyclic prefix of the next orthogonal frequency division multiplexing (OFDM) symbol may be used for automatic gain control (AGC) and/or AGC estimation. In some situations, the cyclic prefix can be longer than in other embodiments.

Additional preamble structure considerations may be made. For example, if one or more of the fields in the preamble has more than one symbol, then information about different frame formats may be conveyed on the consecutive symbols such as in accordance with an encrypted pre-SIG-A field before the bits of the SIG-A field begin to arrive using:
Different symbol content (e.g., using different periodicities for certain fields within a preamble, such as with respect to the STF, and/or portions thereof)
Inverted polarity
Phase shifts The number of symbols of each field may vary (e.g., N1, N2, SIG-A, SIG-B, etc.). As such, the size of the packet may be modified/varied indirectly in accordance with a modification/variation of the preamble size. The variability of such differing numbers of symbols in each field may be made:
On the pre-configured basis
On the semi-static basis
Dynamically, per packet basis The number of symbols of each field may vary (for example N1, N2, SIG-A, SIG-B) depending on any number of factors, including:
Application (usage scenario)
MCS of the data
SNR requirement
Desired Range
Desired power consumption FIG. 18 illustrates an embodiment 1800 of an option table for preamble format options for different transmission types. As mentioned briefly above, with respect to the various combinations, it is submitted that at least one column within FIG. 18 would be selected for use, and then, based on operation in accordance with that selected column, the preamble format will be specified as a function of the type of transmission. It is noted that this table includes a subset of all possible permutations (e.g., of which there may be 27); from certain perspectives, this subset of all possible permutations may be viewed as the more viable permutations of all possible permutations.

For example, if the far right hand column were selected, then the common frame format would be MU for each of the respective operational modes/transmission types of SU Open Loop, SU Closed Loop (Beamforming), and MU.

Alternatively, if the first column option were selected, then a common frame format would be OP1 for each of the respective operational modes/transmission types of SU Open Loop and SU Closed Loop (Beamforming). However, the frame format would be MU for the operational mode/transmission type of MU.

Alternatively, if the second column option (to the right of the first column option) were selected, then a common frame format would be OP2 for each of the respective operational modes/transmission types of SU Open Loop and SU Closed Loop (Beamforming). However, the frame format would be MU for the operational mode/transmission type of MU. The frame formats of the other operational modes/transmission types are as depicted in the diagram.

Figure 19:
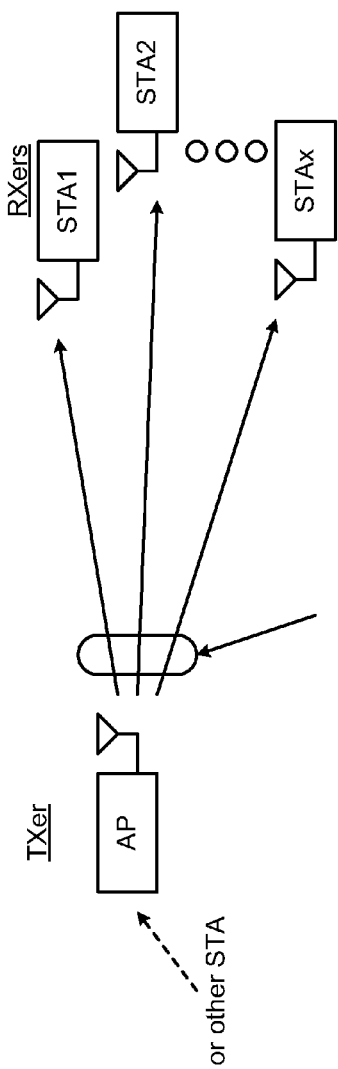
FIG. 19 illustrates an embodiment of communication among two or more communication devices.

FIG. 19 illustrates an embodiment 1900 of communication among two or more communication devices. As may be seen with respect to this diagram, communications may be effectuated between any of a number of different communication devices. For example, from certain perspectives, a transmitter type communication device (e.g., such as an access point (AP) or a wireless station (STA) operating as a network coordinator, network manager, or AP, etc.) may operate to transmit communications to any of a number of receiver type communication devices (e.g., STAs). Of course, anyone of the STA is may also effectuate communications back to the AP or to other of the STA's.

As may be understood with respect to various embodiments and are diagrams herein, one or more packets may be employed to effectuate communications between the various communication devices. Any respective packet may have one of any of a number of different preamble types. In view of the various preamble combinations presented herein, two or more respective preamble types may be employed for any desired communications. Considering those combinations described elsewhere herein such as combination 1, 2, 4, two respective preamble types may be employed for communications made between the various communication devices. Considering the alternative combination 3, three respective preamble types may be employed for communications made between the various vacation devices. Of course, with respect to the combination 5, as few as one preamble type may be employed in certain desired embodiments.

In some instances, a preferred embodiment employing two respective preamble types may be made in accordance with combination 4 described elsewhere herein. While any desired transmitter communication device may construct a signal including a particular desired preamble type in accordance with any desired combination of preamble types, including those described herein, it is also noted that any receiver communication device may determine the operational mode associated with a given communication based upon analysis of a preamble within a received signal. That is to say, when operating in accordance with a particular mode of operation (e.g., utilizing a particular combination of preamble types), a receiver communication device may perform analysis of a particular preamble type to determine the type of communication associated therewith (e.g., such as distinguishing between or among any combination of SU, and MU, beamforming, etc.).

Figure 20:
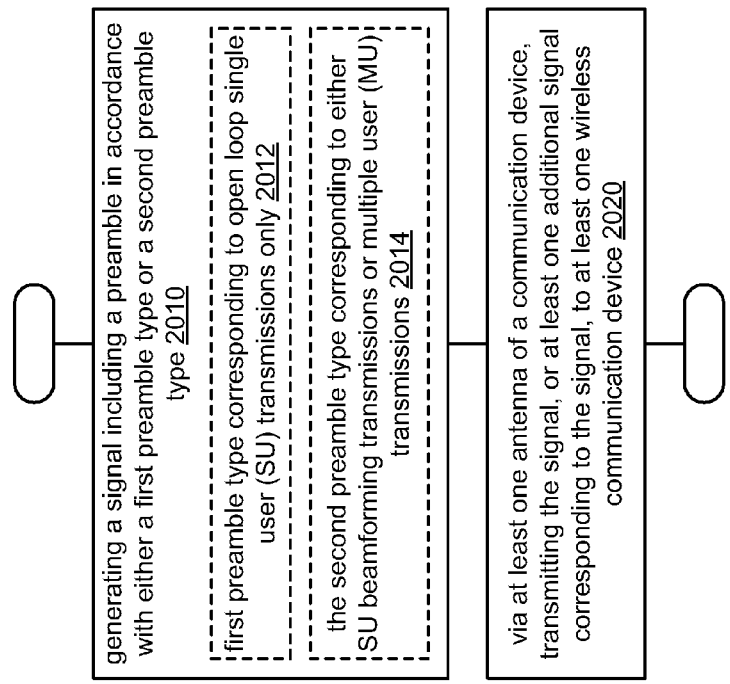
FIG. 20, FIG. 21, and FIG. 22 are diagrams illustrating embodiments of methods for operating one or more wireless communication devices.
Figure 21:
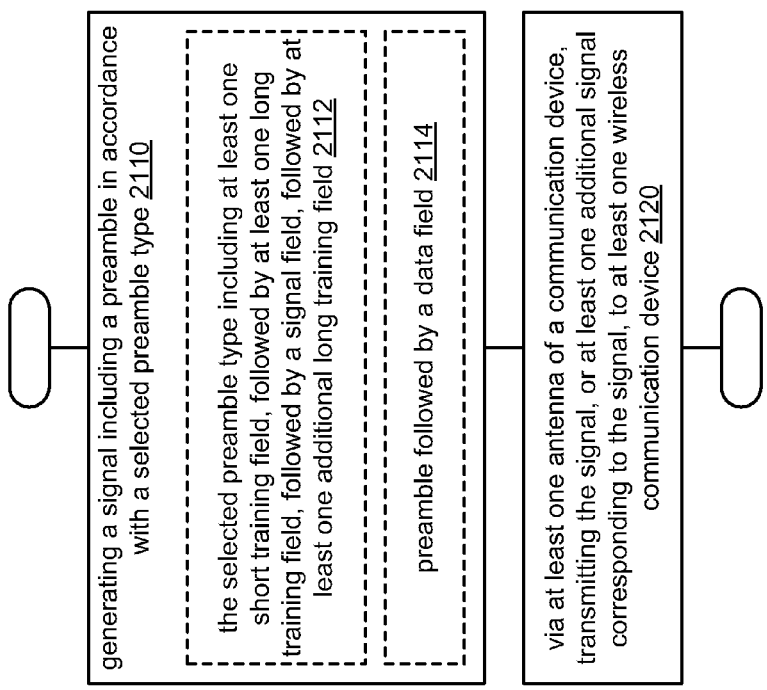
Figure 22:
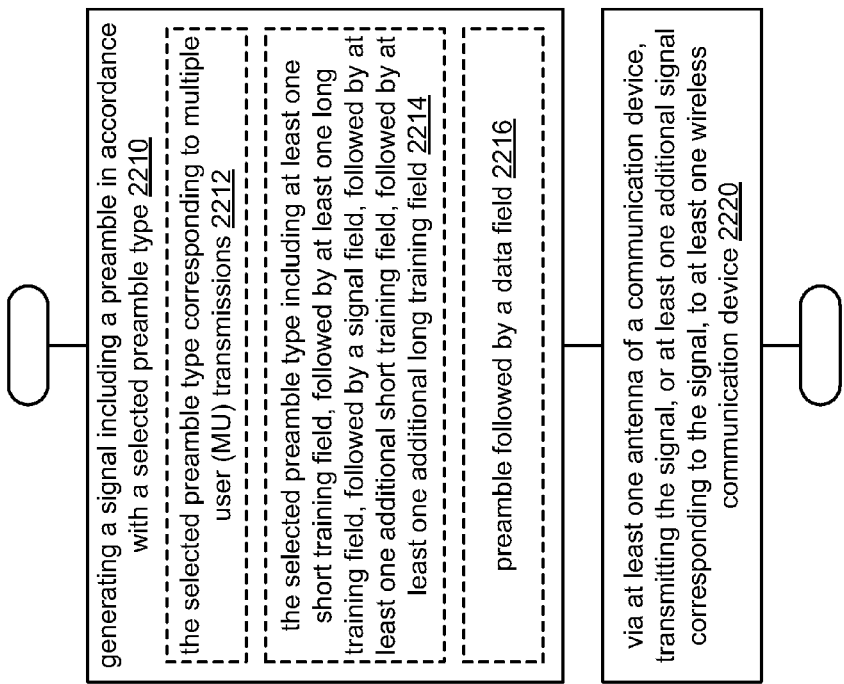

FIG. 20, FIG. 21, and FIG. 22 are diagrams illustrating embodiments of methods for operating one or more wireless communication devices Referring to method 2000 of FIG. 20, the method 2000 begins by generating a signal including a preamble in accordance with either a first preamble type or a second preamble type, as shown in a block 2010. For example, from certain perspectives, a particular combination of preamble types may be employed for communications made between different respective communication devices. In certain embodiments, two or more respective preamble types may be employed, and a given communication device (e.g., a transmitter communication device) may operate to perform selective generation of a signal in accordance with a selective preamble type (e.g., the selected preamble type being one of a number of respective possible preamble types associated with a given combination being employed).

In some instances, the first preamble type corresponds to open loop single-user (SU) transmissions only, as indicated within the block 2012. Also, in certain instances, the second preamble type corresponds to either SU beamforming transitions or multiple user (MU) transmissions, as indicated within the block 2014.

Via at least one antenna of a communication device (e.g., the communication device operative to perform generation of the signal including a preamble having a selected preamble type), the method 2000 continues by transmitting the signal, or at least one additional signal corresponding to the signal, to at least one wireless communication device, as shown in a block 2020. As may be understood, a given communication device may perform generation of a first signal including a preamble having the selected preamble type, and one or more additional operations may be made in accordance with generating a continuous time signal suitable for transmission from one communication device to another communication device via a given communication channel or communication link. As may be understood, different respective operations may be made in accordance with generating such a signal, such as may be performed within an analog front end (AFE) of a communication device (e.g., including domain conversion from analog to digital, frequency shifting, scaling, filtering, and/or any other desired operation to generate a continuous time signal appropriate for transition via a communication channel).

Referring to method 2100 of FIG. 21, the method 2100 begins by generating a signal including a preamble in accordance with a selected preamble type, as shown in a block 2110. As may be understood with respect to this and/or other embodiments and/or diagrams herein, a particular combination of preamble types may be employed for communications made between different respective communication devices. In certain embodiments, two or more respective preamble types may be employed, and a given communication device (e.g., a transmitter communication device) may operate to perform selective generation of a signal in accordance with a selective preamble type (e.g., the selected preamble type being one of a number of respective possible preamble types associated with a given combination being employed).

In some instances, the selected preamble type may be characterized as including at least one short training field, followed the at least one long training field, followed by a signal field, followed by at least one additional long training field, as shown in a block 2112. Such a preamble as generated within a signal may be followed by one or more data fields, as shown in a block 2114.

Via at least one antenna of a communication device (e.g., the communication device operative to perform generation of the signal including a preamble having a selected preamble type), the method 2100 continues by transmitting the signal, or at least one additional signal corresponding to the signal, to at least one wireless communication device, as shown in a block 2120. As may be understood, a given communication device may perform generation of a first signal including a preamble having the selected preamble type, and one or more additional operations may be made in accordance with generating a continuous time signal suitable for transmission from one communication device to another communication device via a given communication channel or communication link. As may be understood, different respective operations may be made in accordance with generating such a signal, such as may be performed within an analog front end (AFE) of a communication device (e.g., including domain conversion from analog to digital, frequency shifting, scaling, filtering, and/or any other desired operation to generate a continuous time signal appropriate for transition via a communication channel).

Referring to method 2200 of FIG. 22, the method 2200 begins by generating a signal including a preamble in accordance with a selected preamble type, as shown in a block 2210. As may be understood with respect to this and/or other embodiments and/or diagrams herein, a particular combination of preamble types may be employed for communications made between different respective communication devices. In certain embodiments, two or more respective preamble types may be employed, and a given communication device (e.g., a transmitter communication device) may operate to perform selective generation of a signal in accordance with a selective preamble type (e.g., the selected preamble type being one of a number of respective possible preamble types associated with a given combination being employed).

In some instances, the selected preamble type may be characterized as corresponding to multiple user (MU) transmissions, as indicated in the block 2212. Also, in some instances, the selected preamble type may be characterized as including at least one short training field, followed by at least one long training field, followed by a signal field, followed by at least one additional short training field, followed by at least one additional long training field, as shown in a block 2214. Such a preamble as generated within a signal may be followed by one or more data fields, as shown in a block 2216.

Via at least one antenna of a communication device (e.g., the communication device operative to perform generation of the signal including a preamble having a selected preamble type), the method 2200 continues by transmitting the signal, or at least one additional signal corresponding to the signal, to at least one wireless communication device, as shown in a block 2220. As may be understood, a given communication device may perform generation of a first signal including a preamble having the selected preamble type, and one or more additional operations may be made in accordance with generating a continuous time signal suitable for transmission from one communication device to another communication device via a given communication channel or communication link. As may be understood, different respective operations may be made in accordance with generating such a signal, such as may be performed within an analog front end (AFE) of a communication device (e.g., including domain conversion from analog to digital, frequency shifting, scaling, filtering, and/or any other desired operation to generate a continuous time signal appropriate for transition via a communication channel).

It is also noted that the various operations and functions as described with respect to various methods herein may be performed within a wireless communication device, such as using a baseband processing module and/or a processing module implemented therein, (e.g., such as in accordance with the baseband processing module 64 and/or the processing module 50 as described with reference to FIG. 2) and/or other components therein including one of more baseband processing modules, one or more media access control (MAC) layers, one or more physical layers (PHYs), and/or other components, etc. For example, such a baseband processing module can generate such signals and frames as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing to generate signals for transmission using at least one of any number of radios and at least one of any number of antennae to another wireless communication device (e.g., which also may include at least one of any number of radios and at least one of any number of antennae) in accordance with various aspects of the invention, and/or any other operations and functions as described herein, etc. or their respective equivalents. In some embodiments, such processing is performed cooperatively by a processing module in a first device, and a baseband processing module within a second device. In other embodiments, such processing is performed wholly by a baseband processing module or a processing module.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

TABLE 1

2.4 GHz, 20/22 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A wireless communication device comprising:
a communication interface; and
a processing circuit, at least one of the processing circuit or the communication interface configured to:
generate a packet that includes a preamble having a preamble format as specified within a predetermined combination of preamble formats for a plurality of transmission types;
generate, when operating based on an open loop single user (SU) transmission type, the preamble based on a first preamble format within the predetermined combination of preamble formats, wherein the first preamble format includes a short training field (STF) adjacently followed by a long training field (LTF) adjacently followed by a first signal field (SIG) adjacently followed by one or more other long training fields (LTFs) adjacently followed by a data field;
generate, when operating based on a SU beamforming transmission type, the preamble based on a second preamble format within the predetermined combination of preamble formats, wherein the second preamble format includes the STF adjacently followed by the LTF adjacently followed by the first SIG adjacently followed by another STF adjacently followed by the one or more other LTFs adjacently followed by a second SIG adjacently followed by the data field and apply SU beamforming weighting to the packet after the first SIG, wherein the SU beamforming weighting is adapted for another wireless communication device;
generate, when operating based on a multiple user (MU) beamforming transmission type, the preamble based on the second preamble format within the predetermined combination of preamble formats and apply MU beamforming to the packet after the first SIG, wherein the MU beamforming weighting is adapted for a plurality of other wireless communication devices; and transmit, when operating based on the open loop SU transmission type or the SU beamforming transmission type, the packet to the another wireless communication device; and transmit, when operating based on the MU beamforming transmission type, the packet to the plurality of other wireless communication devices.

2. The wireless communication device of claim 1, wherein the at least one of the processing circuit or the communication interface is further configured to:

set at least one bit within the first SIG to a first value to indicate the first preamble format when the transmission type is the open loop SU transmission type; and set the at least one bit within the first SIG to a second value to indicate the second preamble format when the transmission type is the SU beamforming transmission type or the MU beamforming transmission type.

3. The wireless communication device of claim 1, wherein the at least one of the processing circuit or the communication interface is further configured to:

generate the preamble based on the second preamble format within the predetermined combination of preamble formats such that the first SIG includes a first plurality of bits having a modulation coding set (MCS) specified for use within a basic services set (BSS) that includes the another wireless communication device and at least one other wireless communication device, and wherein the second SIG includes a second plurality of bits that specify information intended for only the another wireless communication device within the BSS.

4. The wireless communication device of claim 1, wherein the at least one of the processing circuit or the communication interface is further configured to:

set a bit within the first SIG to a first value to indicate a SU transmission type of the preamble; and set the bit within the first SIG to a second value to indicate a MU beamforming transmission type of the preamble.

5. The wireless communication device of claim 1 further comprising:

an access point (AP), wherein the another wireless communication device is a wireless station (STA).

6. A wireless communication device comprising:
a communication interface; and
a processing circuit, at least one of the processing circuit or the communication interface configured to:

generate a packet that includes a preamble having a preamble format as specified within a predetermined combination of preamble formats for a plurality of transmission types;

when operating based on a single user (SU) transmission type:

generate the preamble based on a first preamble format within the predetermined combination of preamble formats and set at least one bit within a first signal field (SIG) of the preamble to a first value to indicate the first preamble format when the SU transmission type is an open loop type, wherein the first preamble format includes a short training field (STF) adjacently followed by a long training field (LTF) adjacently followed by a first signal field (SIG) adjacently followed by one or more other long training fields (LTFs) adjacently followed by a data field;

generate the preamble based on a second preamble format within the predetermined combination of preamble formats and set the at least one bit within the first SIG of the preamble to a second value to indicate the second preamble format when the SU transmission type is a beamforming type, wherein the second preamble format includes the STF adjacently followed by the LTF adjacently followed by the first SIG adjacently followed by another STF adjacently followed by the one or more other LTFs adjacently followed by a second SIG adjacently followed by the data field and apply SU beamforming weighting to the packet after the first SIG, wherein the SU beamforming weighting is adapted for another wireless communication device; and transmit the packet to the another wireless communication device via the communication interface; and when operating based on a multiple user (MU) beamforming transmission type:

generate the preamble based on the second preamble format within the predetermined combination of preamble formats and set the at least one bit within the first SIG of the preamble to the second value to indicate the second preamble format;

apply MU beamforming to the packet after the first SIG, wherein the MU beamforming weighting is adapted for a plurality of other wireless communication devices; and transmit the packet to the plurality of other wireless communication devices via the communication interface.

7. The wireless communication device of claim 6, wherein the at least one of the processing circuit or the communication interface is further configured to:

generate the preamble such that the one or more other LTFs includes a first LTF adjacently followed by a second LTF that is a repetition of the first LTF.

8. The wireless communication device of claim 6, wherein the at least one of the processing circuit or the communication interface is further configured to:

generate the first SIG based on a modulation coding set (MCS) specified for use within a basic services set (BSS) that includes the another wireless communication device and the plurality of other wireless communication devices, wherein all wireless communication devices within the BSS include capability to process the first SIG based on the MCS.

9. The wireless communication device of claim 6, wherein the at least one of the processing circuit or the communication interface is further configured to:

generate the preamble based on the first preamble format including to generate the first SIG to indicate a modulation coding set (MCS) of the data field of the packet; and generate the preamble based on the second preamble format including to generate the first SIG and the second SIG to indicate the MCS of the data field of the packet.

10. The wireless communication device of claim 6, wherein the at least one of the processing circuit or the communication interface is further configured to:

generate the preamble including to generate the first SIG to indicate a first modulation coding set (MCS) of the second SIG, wherein the second SIG indicates a difference between the first MCS of the second SIG and a second MCS of the data field.

11. The wireless communication device of claim 6, wherein the at least one of the processing circuit or the communication interface is further configured to:

generate the preamble based on the second preamble format within the predetermined combination of preamble formats such that the first SIG includes a first plurality of bits having a modulation coding set (MCS) specified for use within a basic services set (BSS) that includes the another wireless communication device and at least one other wireless communication device, and wherein the second SIG includes a second plurality of bits that specify information intended for only the another wireless communication device within the BSS.

12. The wireless communication device of claim 6, wherein the at least one of the processing circuit or the communication interface is further configured to:
generate the preamble such that the one or more other LTFs includes a first LTF composed of a first symbol adjacently followed by a second LTF composed of a second symbol.

13. The wireless communication device of claim 6 further comprising:
an access point (AP), wherein the another wireless communication device is a wireless station (STA).

14. A method for execution by a wireless communication device, the method comprising:
generating a packet that includes a preamble having a preamble format as specified within a predetermined combination of preamble formats for a plurality of transmission types;
when operating based on a single user (SU) transmission type:
generating the preamble based on a first preamble format within the predetermined combination of preamble formats and setting at least one bit within a first signal field (SIG) of the preamble to first value to indicate the first preamble format when the SU transmission type is an open loop type, wherein the first preamble format includes a short training field (STF) adjacently followed by a long training field (LTF) adjacently followed by a first signal field (SIG) adjacently followed by one or more other long training fields (LTFs) adjacently followed by a data field;
generating the preamble based on a second preamble format within the predetermined combination of preamble formats and setting the at least one bit within the SIG of the preamble to second value to indicate the second preamble format when the SU transmission type is a beamforming type, wherein the second preamble format includes the STF adjacently followed by the LTF adjacently followed by the first SIG adjacently followed by another STF adjacently followed by the one or more other LTFs adjacently followed by a second SIG adjacently followed by the data field and applying SU beamforming weighting to the packet after the first SIG, wherein the SU beamforming weighting is adapted for another wireless communication device; and
transmitting the packet to the another wireless communication device via a communication interface of the another wireless communication device; and
when operating based on a multiple user (MU) beamforming transmission type:
generating the preamble based on the second preamble format within the predetermined combination of preamble formats and setting the at least one bit within the first SIG of the preamble to the second value to indicate the second preamble format;
applying MU beamforming weighting to the packet after the first SIG, wherein the MU beamforming weighting is adapted for a plurality of other wireless communication devices; and
transmitting the packet to the plurality of other wireless communication devices via the communication interface.

15. The method of claim 14 further comprising:
generating the preamble such that the one or more other LTFs includes a first LTF adjacently followed by a second LTF that is a repetition of the first LTF.

16. The method of claim 14 further comprising:
generating the first SIG based on a modulation coding set (MCS) specified for use within a basic services set (BSS) that includes the another wireless communication device and the plurality of other wireless communication devices, wherein all wireless communication devices within the BSS include capability to process the first SIG based on the MCS.

17. The method of claim 16 further comprising:
generating the preamble based on the first preamble format including to generate the first SIG to indicate a modulation coding set (MCS) of the data field of the packet; and
generating the preamble based on the second preamble format including to generate the first SIG and the second SIG to indicate the MCS of the data field of the packet.

18. The method of claim 14 further comprising:
generating the preamble including to generate the first SIG to indicate a first modulation coding set (MCS) of the second SIG, wherein the second SIG indicates a difference between the first MCS of the second SIG and a second MCS of the data field.

19. The method of claim 14 further comprising:
generating the preamble based on the second preamble format within the predetermined combination of preamble formats such that the first SIG includes a first plurality of bits having a modulation coding set (MCS) specified for use within a basic services set (BSS) that includes the another wireless communication device and at least one other wireless communication device, and wherein the second SIG includes a second plurality of bits that specify information intended for only the another wireless communication device within the BSS.

20. The method of claim 14, wherein the wireless communication device is an access point (AP), and the another wireless communication device is a wireless station (STA).

* * * * *